United States Patent
Hanson et al.

(10) Patent No.: US 10,152,767 B1
(45) Date of Patent: Dec. 11, 2018

(54) MEMORY EFFICIENT ON-CHIP BUFFERING FOR PROJECTIVE TRANSFORMATION

(71) Applicant: The MathWorks, Inc., Natick, MA (US)

(72) Inventors: Michael Neil Hanson, Glasgow (GB); Garrey William Rice, Glasgow (GB); Brian K. Ogilvie, Holliston, MA (US); Witold R. Jachimczyk, Sutton, MA (US)

(73) Assignee: The MathWorks, Inc., Natick, MA (US)

( * ) Notice: Subject to any disclaimer, the term of this patent is extended or adjusted under 35 U.S.C. 154(b) by 7 days.

(21) Appl. No.: 15/380,500

(22) Filed: Dec. 15, 2016

(51) Int. Cl.
G09G 5/36 (2006.01)
G06T 1/60 (2006.01)
G06F 3/06 (2006.01)

(52) U.S. Cl.
CPC .............. *G06T 1/60* (2013.01); *G06F 3/0608* (2013.01); *G06F 3/0611* (2013.01); *G06F 3/0644* (2013.01); *G06F 3/0673* (2013.01); *G06F 2212/173* (2013.01); *G06T 2200/28* (2013.01)

(58) Field of Classification Search
CPC ........ H04N 9/3185; H04N 5/74; G06T 5/006; G06T 11/00; G06T 19/006; G06T 2207/20021; G06T 3/00; G06T 5/001; G06T 7/70
See application file for complete search history.

(56) References Cited

U.S. PATENT DOCUMENTS

| | | | |
|---|---|---|---|
| 8,670,001 B2 | 3/2014 | Comer et al. | |
| 9,031,349 B1 | 5/2015 | Ma | |
| 2008/0174516 A1* | 7/2008 | Xiao ................... | H04N 9/3147 345/1.3 |
| 2010/0014770 A1* | 1/2010 | Huggett ................ | G06T 3/00 382/260 |
| 2015/0348516 A1* | 12/2015 | Hayashi ................ | G09G 3/002 345/545 |
| 2016/0180179 A1* | 6/2016 | Yokota ................. | B60R 1/00 348/148 |
| 2017/0100088 A1* | 4/2017 | Simon .................. | A61B 6/5258 |

* cited by examiner

*Primary Examiner* — Hau H Nguyen
(74) *Attorney, Agent, or Firm* — Harrity & Harrity, LLP

(57) ABSTRACT

A device may receive information associated with an input image that includes a first quantity of rows. The device may store pixel values, for a second quantity of rows, based on the information associated with the input image. The second quantity of rows may be different than the first quantity of rows. The device may generate an output image, that includes a projective transformation of the input image, based on the stored pixel values. The device may provide information associated with the output image.

20 Claims, 16 Drawing Sheets

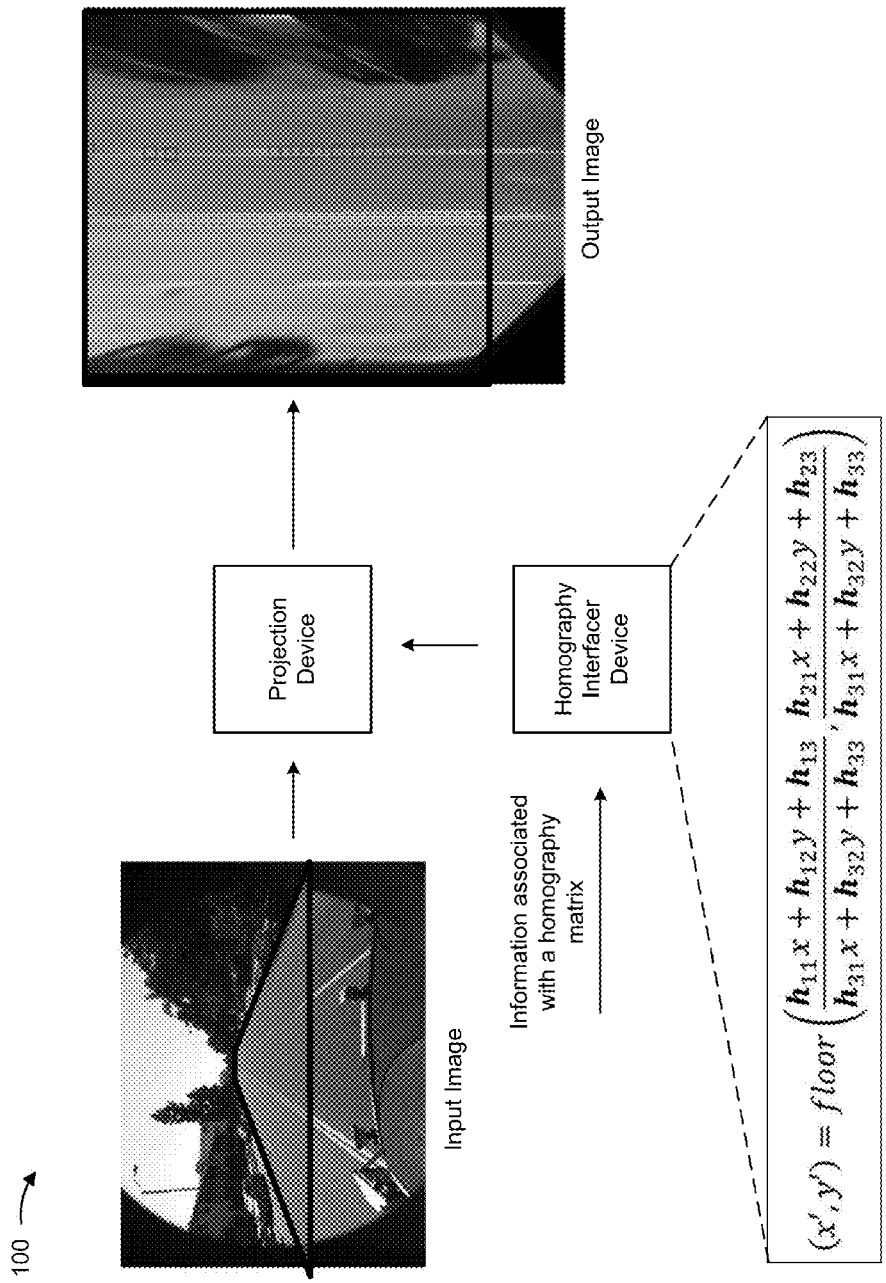

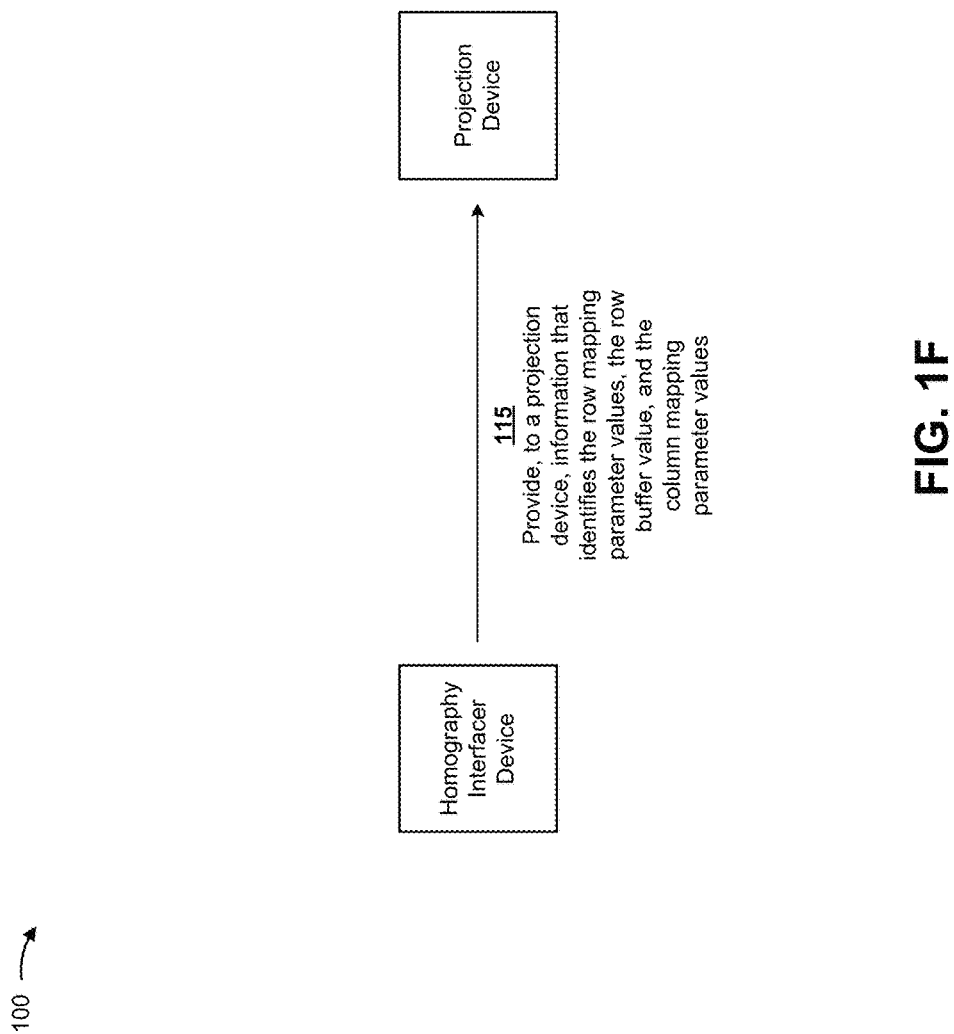

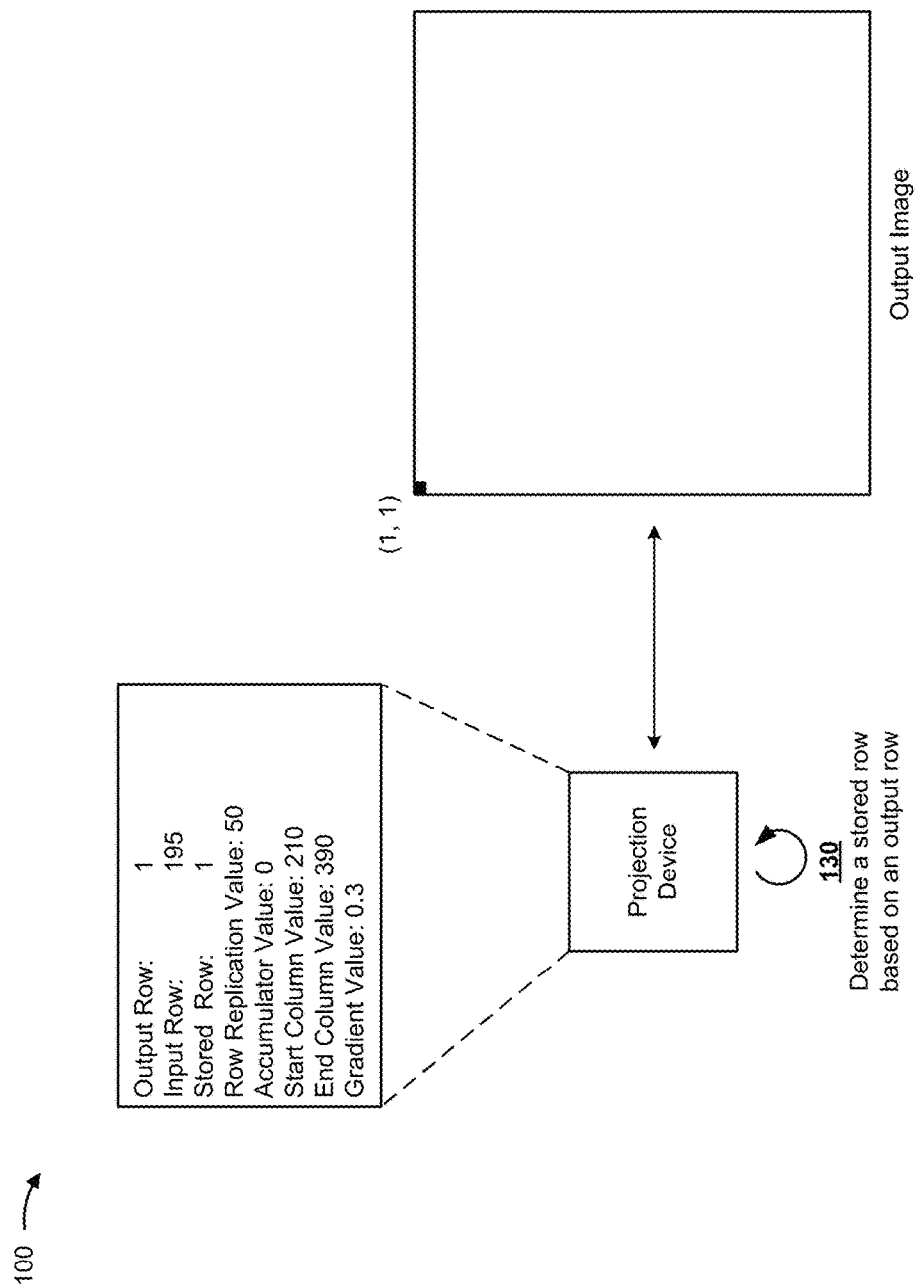

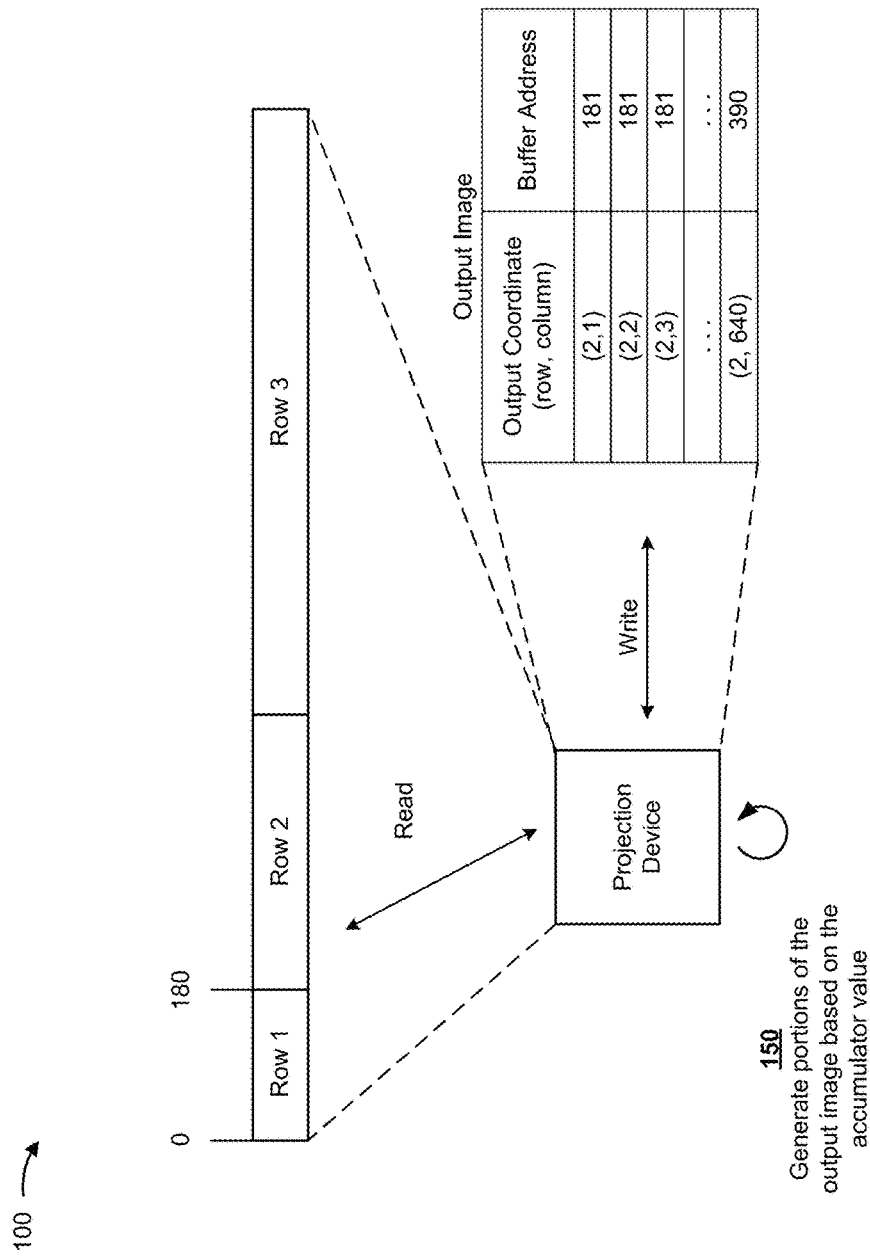

MEMORY EFFICIENT ON-CHIP BUFFERING FOR PROJECTIVE TRANSFORMATION

BRIEF DESCRIPTION OF THE DRAWINGS

FIGS. 1A-1L are diagrams of an overview of an example implementation described herein;

DETAILED DESCRIPTION

The following detailed description of example implementations refers to the accompanying drawings. The same reference numbers in different drawings may identify the same or similar elements.

An advanced driver assistance system (ADAS) may utilize image data and/or image processing techniques to increase vehicle safety, enable autonomous driving, or the like. For example, an ADAS may receive, from sensor devices and/or image processing devices of a vehicle, image data associated with surroundings of the vehicle. The ADAS may process the image data to perform object recognition, lane detection, etc. Further, the ADAS may provide an alert to warn a driver of a potential hazard, may automate braking, may rectify a lane departure, etc. As such, an ADAS may be required to minimize latency while processing captured image data (e.g., to prevent a collision, to provide adequate warning to the driver, or the like). With increased vehicle velocity, such a requirement becomes more acute.

Implementations described herein may enable a projection device (e.g., a device including a field-programmable gate array (FPGA)) to receive an input image, store a subset of pixel values associated with the input image, generate an output image (e.g., a bird's eye view image) based on the stored subset of pixel values, and provide information that identifies the output image (e.g., provide information associated with the output image to an ADAS device).

Implementations described herein enable the projection device to store a subset of pixel values associated with an input frame, thereby conserving memory resources of the projection device. Additionally, implementations described herein enable the projection device to store the subset of pixel values in on-chip random access memory (RAM) (e.g., RAM embedded on the FPGA). Thereby, implementations described herein may reduce a latency associated with requesting particular pixel values, of the subset of pixel values, from a buffer and generating an output image based on the particular pixel values (e.g., as compared to requesting pixel values from an external frame buffer). Additionally, implementations described herein may reduce a quantity of inefficient mathematical operations (e.g., division operations) required for projective transformation, thereby conserving processor and/or memory resources. Additionally, implementations described herein enable the projection device to generate the output image without requiring that an entire input frame be received, thereby reducing latency associated with the image processing of the generated image.

Figure 1B:
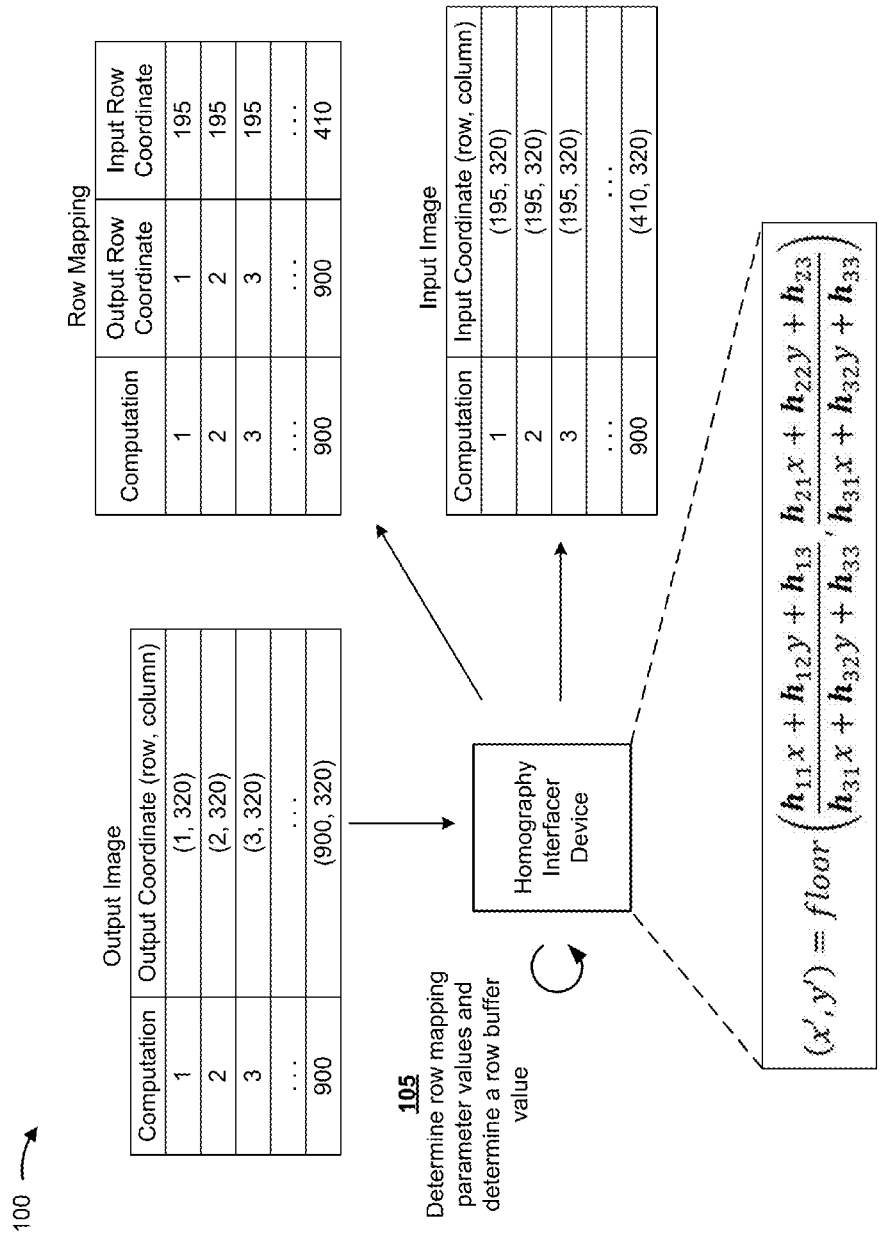

FIG. 1A-1L are diagrams of an overview of an example implementation 100 described herein. As shown in FIG. 1A, a projection device (e.g., an embedded hardware device associated with a vehicle) may generate an output image based on an input image and/or information received from a homography interfacer device (e.g., an image processing device). As an example, an image acquisition device (e.g., a front-facing camera, a sensor, etc.) associated with a vehicle may capture images (e.g., rectilinear images, wide-angle images, etc.) of the vehicle's surroundings, and may provide the captured images as input images to the projection device. As shown, the projection device may generate an output image of the vehicle's surroundings (e.g., a bird's eye view image, such as an image that represents an aerial view of the vehicle's surroundings). The output image (e.g., the bird's eye view image) may be used for ADAS applications, such as lane detection, autonomous driving assistance, or the like. While not shown, it should be understood that the projection device may provide, to an ADAS, information associated with an output image. The ADAS may, for example, utilize the information associated with the output image to provide information for display (e.g., an image including lane markings, or the like), to implement an autonomous driving technique, and/or the like.

In some implementations, the homography interfacer device may determine, based on a projective transformation equation, information that identifies parameter values to be used by the projection device when performing image processing. Additionally, the homography interfacer device may provide, to the projection device, the information which may enable the projection device to perform image processing at a reduced latency, at a higher throughput, etc. For example, the homography interfacer device may provide, to the projection device, information that identifies parameter values (e.g., hardware description language (HDL) code (and/or other program code)), that may be used to program the projection device. While some implementations are described herein in terms of devices associated with a vehicle, other implementations may include other types of image acquisition devices and/or projection devices associated with other environments. Additionally, while some implementations are described herein with respect to a generated bird's eye view image, other implementations may include other types of images generated based on a projective transformation.

In some implementations, the homography interfacer device may determine (e.g., generate) a homography matrix. For example, a homography matrix may include a 3×3 matrix of values that relates pixel coordinates in a first image and pixel coordinates in a second image. Additionally, or alternatively, the homography matrix may map a pixel coordinate of a point on a first plane associated with a first image and a pixel coordinate of a corresponding point on another plane associated with a second image. For example, as shown in FIG. 1A, values associated with a homography matrix (e.g., $h_{11}$, $h_{12}$, $h_{13}$, etc.) may be used to map pixel coordinates associated with a plane of the input image (e.g., depicted as the road surface), and pixel coordinates associated with a corresponding plane of the output image (e.g., the road surface).

In some implementations, the homography interfacer device may receive, from a user device (e.g., a computing device), information that identifies image acquisition device parameter values. For example, the homography interfacer device may receive information that identifies image acquisition device parameter values including intrinsic parameter values (e.g., tangential distortion, radial distortion, a focal length, a principal point, a skew coefficient, pixel size, aspect ratio, etc.) and extrinsic parameter values (a rotation matrix and a translation vector that correspond to a mounting position of the image acquisition device described by a height value, a pitch value, a yaw value, a roll value, etc.). The extrinsic parameter values may, for example, relate to a position of the image acquisition device relative to a particular reference frame, reference point, or the like. In some implementations, the homography interfacer device may determine the homography matrix based on the received information and/or based on implementing a particular technique (e.g., a geometrical relation technique, a direct linear transformation technique, a homogenous solution technique, a non-linear geometric solution technique, or the like).

In some implementations, the homography interfacer device may determine an updated homography matrix. For example, the homography interfacer device may determine an updated homography matrix based on a time frame (e.g., every day, every week, every month, etc.). Additionally, or alternatively, the homography interfacer device may determine a homography matrix based on determining a variation in a particular image acquisition device parameter value (e.g., an extrinsic parameter value). As an example, a position and/or orientation of an image acquisition device may vary with time, may vary based on operation of a vehicle, etc. Thus, the homography interfacer device may receive information that indicates that an image acquisition device parameter value has changed, and may determine an updated homography matrix. Additionally, or alternatively, the homography interfacer device may determine an updated homography matrix based on surroundings of the vehicle. For example, in ADAS implementations, the homography interfacer device may detect a variation in a road surface (e.g., an elevation change, such as an incline, a decline, or the like) based on one or more sensor devices (e.g., an optical sensor, a light detection and ranging (LIDAR) sensor, an accelerometer, or the like). Additionally, or alternatively, the homography interfacer device may determine an updated homography matrix based on the detected variation.

In some implementations, the homography interfacer device may receive information that identifies the input image. For example, the homography interfacer device may receive, from an image acquisition device, information associated with the input image. Additionally, or alternatively, the homography interfacer device may receive information that identifies a memory location associated with the input image, and may retrieve the input image based on the memory location.

In some implementations, the homography interfacer device may implement the projective transformation equation shown in FIG. 1A to determine pixel coordinates, associated with the output image, that map to pixel coordinates associated with the input image. As an example, the homography interfacer device may determine, based on a particular output image coordinate (e.g., x', y') and the homography matrix (the 3×3 matrix), a corresponding pixel coordinate associated with the input image. Additionally, the homography interfacer device may, when implementing the projective transformation equation, use a floor or ceiling function that rounds a mathematical value that includes a fraction and/or decimal to the nearest smaller or larger integer (or returns the mathematical value if the mathematical value does not include a fraction and/or decimal value).

In some implementations, an image (e.g., the input image and/or the output image) may include a two-dimensional image (e.g., a digital photograph, a digital picture, etc.), a three dimensional image (e.g., a three-dimensional image model, etc.), a segment of a video (e.g., a frame or a still image included in a video), or the like. In some implementations, the image may include a two-dimensional matrix of pixels (e.g., an m×n array, where m and n may be the same value or different values), a three dimensional matrix (e.g., an m×n×z matrix, where two or more of m, n, and z may be the same value or different values), or the like.

In some implementations, the image may include a two-dimensional matrix of pixels aligned along a first dimension (e.g., a column) and adjacent pixels aligned along a second dimension (e.g., a row). The matrix of pixels may be represented as an m×n matrix, where m is greater than or equal to one, and n is greater than or equal to one. The homography interfacer device may receive information identifying a size of the matrix (or matrices), such as a value for m (e.g., a quantity of pixels aligned along the first dimension) and a value for n (e.g., a quantity of pixels aligned along the second dimension).

In some implementations, the homography interfacer device may determine the size of the matrix of pixels based on a size, a resolution, and/or a quantity of pixels included in the image. In some implementations, a pixel may be associated with a pixel value. For example, a pixel value may refer to a manner in which the pixel appears. For example, the pixel value may specify an intensity of the pixel (e.g., a brightness of the pixel, a value of a gray tone for a pixel), a color of a pixel (e.g., one or more red-green-blue (RGB) values for a pixel), or the like.

While some implementations are described herein with respect to pixels and/or matrices of pixels, other implementations may include scalar values and/or matrices of scalar values. A scalar value may refer to, for example, a picture element (e.g., a pixel), a volume element (e.g., a voxel or a three-dimensional analogue of a two-dimensional pixel), a surface element (e.g., a surfel), a textual element (e.g., a texel), a lux element (e.g., a luxel), a resolution element (e.g., a resel), or the like.

As shown in FIG. 1B, the homography interfacer device may, for particular output image coordinates, determine corresponding input image coordinates. In some implementations, the homography interfacer device may determine a corresponding input image coordinate for each output coordinate of the output image (e.g., based on the projective transformation equation and the homography matrix). Alternatively, the homography interfacer device may determine corresponding input image coordinates for a subset of output image coordinates (e.g., (1, 320), (2, 320), (3, 320), ... (900, 320)). For example, as shown in FIG. 1B, the homography interfacer device may perform particular computations by using a particular output coordinate, the projective transformation equation, and homography matrix values. As an example, as shown by "Computation 1," the homography interfacer device may determine that the output image coordinate (1, 320) maps to the input image coordinate (195, 320). As an example, assume that the output image includes an image width of 640 pixels. By using a particular output column coordinate (e.g., half of the output image width, such as the column coordinate 320), the homography interfacer device may reduce a quantity of calculations required to determine row mapping parameter values, thereby conserving processor and/or memory resources of the homography interfacer device. For example, row mapping parameter values may include values that may be used by the projection device when generating output images, as described elsewhere herein.

In some implementations, a subset of input image coordinates may map to output image coordinates based on the homography matrix. As an example, and referring back to FIG. 1A, input image coordinates associated with a plane representing the road surface may map to output image coordinates, whereas other input image coordinates may not map to output image coordinates. As used herein, an area of operation of the algorithm may refer to a set of pixel coordinates, associated with the input image, that correspond to the road surface (e.g., shown in FIG. 1A as an area that is trapezoidal in nature). In some implementations, pixel coordinates associated with the area of operation may map to output image pixel coordinates, whereas pixel coordinates that are not associated with the area of operation may not map to output image pixel coordinates (e.g., based on the homography matrix). Referring back to FIG. 1B, by using a particular output image column coordinate (e.g., 320), the homography interfacer device may determine that a subset of output image coordinates corresponds to a subset of input image coordinates (e.g., based on the area of operation). Thereby, the homography interfacer device may conserve processor and/or memory resources by reducing a quantity of calculations needed to determine a row mapping. While implementations herein describe and/or depict an area of operation that is trapezoidal in nature, it should be understood that other implementations may include other areas of operation that include different shapes and/or geometries (e.g., based on respective homography matrices).

As shown in FIG. 1B, and by reference number 105, the homography interfacer device may determine row mapping parameter values and may determine a row buffer value. For example, the homography interfacer device may determine row mapping parameter values and/or a row buffer value based on determining a mapping between output image coordinates and input image coordinates. As an example, as shown in a row mapping table in FIG. 1B, the homography interfacer device may determine that output row coordinate 1 maps to input row coordinate 195, that output row coordinate 2 maps to input row coordinate 195, that output row coordinate 3 maps to row coordinate 195, and that output row coordinate 900 maps to input row coordinate 410.

In some implementations, the homography interfacer device may determine a row mapping parameter value. For example, a row mapping parameter value may include information that a projection device may use when generating an output image based on an input image (e.g., information that maps a row and/or column coordinate in the output image to a corresponding row and/or column coordinate in the input image). In some implementations, the homography interfacer device may determine a row mapping parameter value based on the projective transformation equation. For example, the homography interfacer device may determine a row mapping parameter value based on determining input image coordinates that map to output image coordinates (e.g., based on performing computations using the projective transformation equation and various output image coordinate values). In some implementations, a row mapping parameter value may include a start row value. For example, a start row value may include a row coordinate associated with a row of the input image. Additionally, or alternatively, the start row value may include a row coordinate associated with the first row (e.g., a starting row), of the input image, that includes a pixel for which the projection device may store a pixel value, as described elsewhere herein. In some implementations, the start row value may include a row coordinate associated with the first row, of the input image, that includes an input image coordinate that is mapped to an output image coordinate (e.g., includes a pixel having a pixel value that is used to generate an output image). For example, as shown in FIG. 1B, the start row value may include the row value associated with "Computation 1." That is, the start row value may include the row value of the input image coordinate that maps to the first output image coordinate (e.g., (1, 1)).

In some implementations, a row mapping parameter value may include an end row value. For example, an end row value may include a row coordinate associated with a row of the input image. Additionally, the end row value may include a row coordinate associated with the last row (e.g., an ending row), of the input image, that includes a pixel for which the projection device may store a pixel value, as described elsewhere herein.

In some implementations, a row mapping parameter value may include a row buffer value. For example, a row buffer value may include a quantity of rows, associated with the input image, that include pixels for which the projection device may store pixel values, as described elsewhere herein. In some implementations, the row buffer value may be a difference between the start row value and the end row value.

In some implementations, the row mapping parameter value may include a row mapping value. For example, a row mapping value may include information that associates a particular row of the input image and a particular row (or set of rows) of the output image. For example, a row mapping value may associate a particular row of the input image (e.g., row 195) and particular rows of the output image (e.g., rows 1 through 50). For example, one or more input image coordinates associated with row 195 of the input image may map to output image coordinates associated with rows 1 through 50 of the output image.

In some implementations, the row mapping parameter value may include a row replication value. For example, a row replication value may include a value that identifies a quantity of times that an input row (e.g., pixel values associated with one or more pixels of the input row) is replicated in the output image. For example, row 195 of the input image may map to rows 1 through 50 of the output image (e.g., pixel values associated with row 195 may be replicated in rows 1 through 50 of the output image).

In some implementations, the homography interfacer device may receive, from a user device (e.g., which may have received an input from a user), information that identifies one or more row mapping parameter values. For example, the homography interfacer device may provide, to the user device, information that identifies the mapping between input rows and output rows. In this way, a user may interact with the user device to select particular row mapping parameter values. As an example, a user may interact with the user device to select a particular start row value, a particular end row value, or the like.

In some implementations, the homography interfacer device may determine the row mapping parameter values based on information that identifies a row buffer value. For example, the homography interfacer device may receive, from a user device, information that identifies a row buffer value. As an example, assume that the row buffer value is 50. In this case, the homography interfacer device may determine a start row value and an end row value based on the row buffer value (e.g., such that 50 rows of the input image may be buffered). Additionally, or alternatively, the homography interfacer device may determine a start row value, an end row value, and/or a row buffer value based on information that identifies a resolution of the output image. For example, assume that the homography interfacer device receives, from a user device, information that indicates that the resolution of the output image is to include a particular quantity of rows. In this case, the homography interfacer device may determine a quantity of rows, of the input image, that are required to generate an output image of the particular resolution. As an example, assume that the output image resolution includes 700×640 pixels. In this case, the homography interfacer device may determine that 60 rows of the input image are required to generate the output image of the particular resolution (e.g., row 195 through row 255).

Figure 1C:
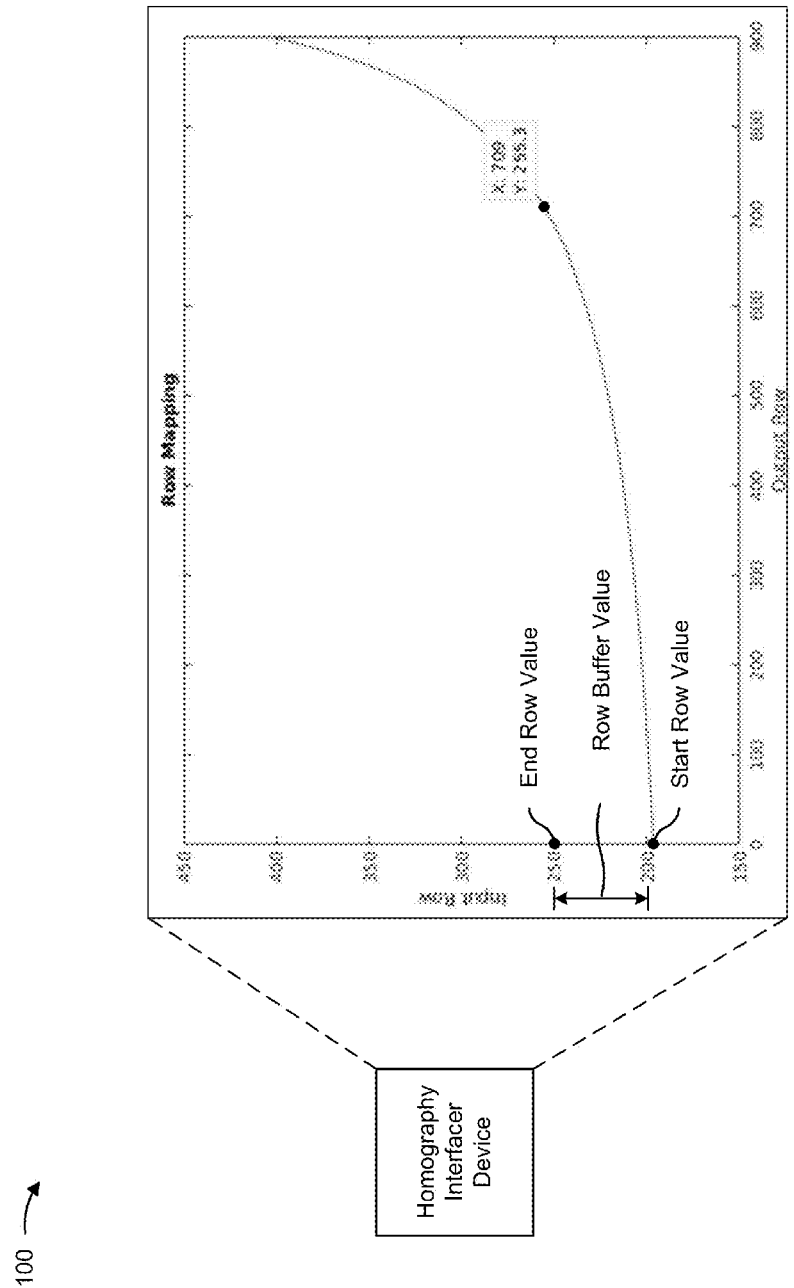

For example, FIG. 1C depicts a graphical representation of a mapping between output rows and input rows. For example, the graphical representation shown in FIG. 1C may be generated based on values determined by the computations shown in FIG. 1B (e.g., values shown in the row mapping table). As shown in FIG. 1C, a subset of input rows (e.g., rows 195 through 410) may map to output rows based on the homography matrix (e.g., input rows associated with the area of operation). As an example, row 1 through row 195 of the input image (e.g., corresponding to portions of the input image beyond a vanishing point associated with a horizon) and row 410 through row 450 (e.g., corresponding to portions of the input image associated with a hood of the vehicle) may not map to output rows based on the homography matrix. As another example, and as shown in FIG. 1C, roughly 50 rows (e.g., input row 195 through input row 245) of the input image (e.g., corresponding to the area of operation) may be used to generate an output image that includes 700 rows (e.g., output row 1 through output row 700). As such, particular input rows may be replicated in the output image. For example, pixel values of a particular row of the input image may be replicated and/or interpolated to generate multiple rows of the output image. As an example, particular pixel values of the input image may be replicated and/or interpolated (e.g., horizontally or vertically) to generate the output image.

Figure 1D:
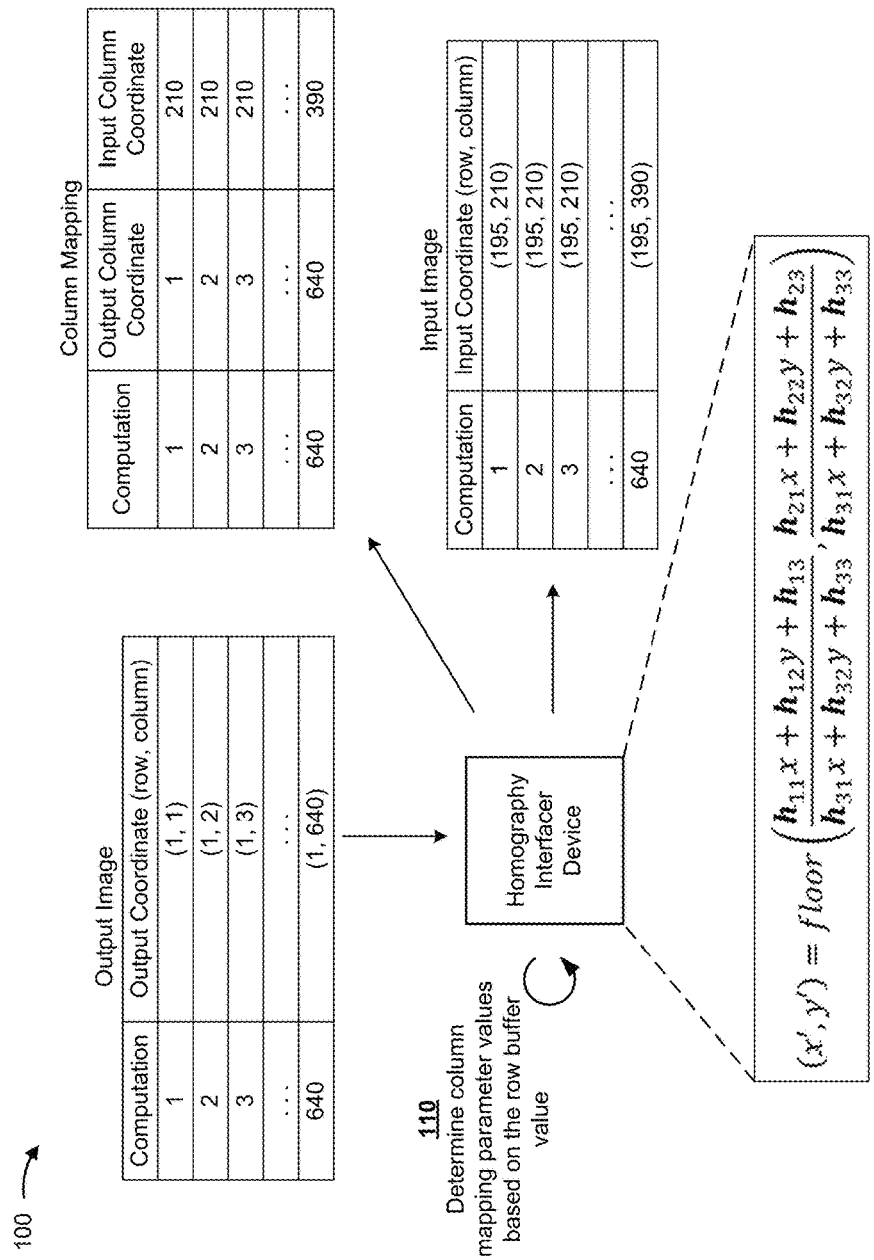

As shown in FIG. 1D, and by reference number 110, the homography interfacer device may determine column mapping parameter values based on the row buffer value. In some implementations, the homography interfacer device may determine column mapping parameter values (e.g., a start column value, an end column value, and/or a gradient value) for each row associated with the row buffer value (e.g., each input row included within the start row value and the end row value). For example, assume that the homography interfacer device determines a row buffer value of 50 rows (e.g., input row 195 through row 245). In this case, the homography interfacer device may determine column mapping parameter values for each respective row of row 195 through row 245.

For example, as shown in FIG. 1D, the homography interfacer device may perform computations using output image coordinates (e.g., that are associated with an input row included within the row buffer value), and may determine corresponding input image coordinates. As an example, and as shown in FIG. 1D, the homography interfacer device may perform 640 computations (e.g., a computation for each output column), and may determine corresponding input image coordinates for input row 195 (e.g., corresponding to output row 1). While not shown, the homography interfacer device may perform similar computations for the other input rows that are associated with the row buffer value (e.g., input row 191 through input row 245).

As shown in FIG. 1D by a column mapping table, the homography interfacer device may determine, for output row 1, that output column coordinate 1 maps to input column coordinate 210. Additionally, the homography interfacer device may determine, for output row 1, that output column coordinate 640 maps to input column coordinate 390.

In some implementations, a column mapping parameter value may include a start column value. For example, a start column value may include a column coordinate, associated with a row of the input image, that includes a pixel for which the projection device may store a pixel value, as described elsewhere herein. In some implementations, the homography interfacer device may determine a start column value, for a particular row, based on determining a corresponding input image coordinate for an output coordinate of the output image. For example, for a particular row of the output image, the homography interfacer device may adjust column coordinates, and may determine corresponding input image coordinates. As an example, and as shown in FIG. 1D, for output image coordinates associated with the first row of the output image (e.g., (1, 1), (1, 2), (1, 3), . . . (1, 640)), the homography interfacer device may determine corresponding input image coordinates (e.g., based on the projective transformation equation and the homography matrix). In some implementations, the homography interfacer device may determine a start column value, for a particular row, based on determining an input image coordinate that maps to a particular output image coordinate (e.g., (n, 1), where n is equal to the particular row coordinate of the output image). As an example, and as shown in FIG. 1D, for the input row associated with the start row value (e.g., row 195), the homography interfacer device may determine a start column value of 210. In this case, the input image coordinate (195, 210) may map to a particular output image coordinate (1, 1). For example, input image coordinates (195, 1) through (195, 209) may not map to output image coordinates based on the homography matrix.

In some implementations, a column mapping parameter value may include an end column value. For example, an end column value may include the last column coordinate, associated with a row of the input image, that includes a pixel for which the projection device may store a pixel value, as described elsewhere herein. In other words, the projection device may store pixel values, associated with pixels having column coordinates between (inclusive) the start column value and the end column value for a particular row. In some implementations, the homography interfacer device may determine an end column value for a particular row. For example, the homography interfacer device may determine an end column value, for a particular row, based on determining an input image coordinate that maps to a particular output image coordinate (e.g., (n, x), where n is equal to the particular row coordinate, and x is equal to the width of the output image in pixels). As an example, and as shown in FIG. 1D, for row 195, the homography interfacer device may determine an end column value of 390. In this case, the input image coordinate (195, 390) may map to the output image coordinate (1, 640).

In some implementations, the column mapping parameter value may include a gradient value. In some implementations, the homography interfacer device may perform a linear regression analysis based on input column coordinates and output column coordinates for a particular row, and may determine a gradient value (e.g., a slope of a fitted line generated based on the mapping between input column coordinates and output column coordinates). The gradient value may identify, for example, a quantity of times a particular pixel value is replicated in a particular row of the output image. As an example, a row that includes a lower gradient value may include more replicated pixel values than as compared to a row that includes a greater gradient value.

In some implementations, the homography interfacer device may determine column mapping parameter values for each row of the input image that is associated with the row buffer value. For example, each row of the input image may include a different start column value, end column value, and/or gradient value.

Figure 1E:
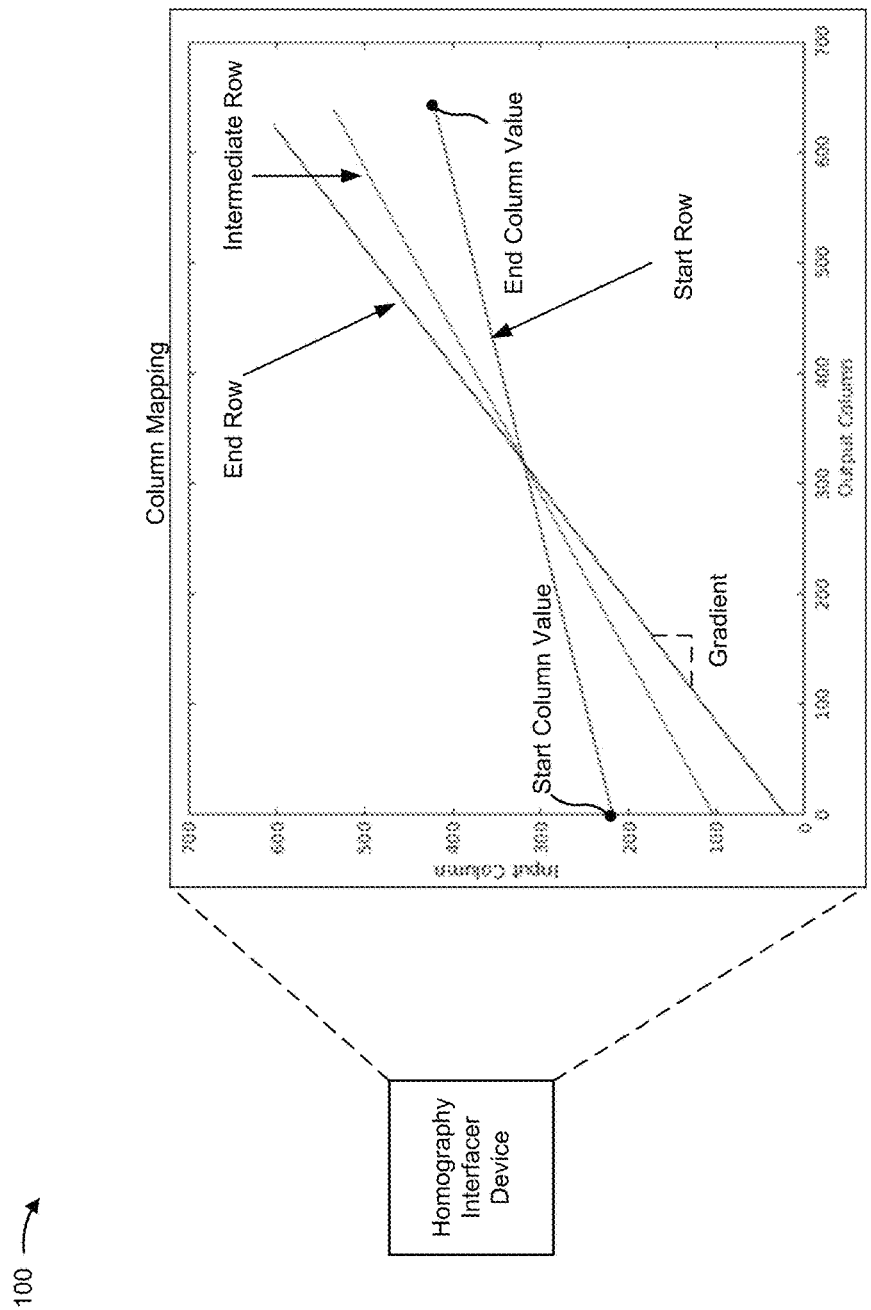

FIG. 1E depicts a graphical representation of a mapping between input column coordinates and output column coordinates. As an example, each line depicted in FIG. 1E may represent a mapping between column coordinates associated with a particular input row and column coordinates associated with a corresponding output row. While three lines (e.g., a line associated with a start row, a line associated with an end row, and a line associated with an intermediate row) are shown for example purposes, in some implementations, a line corresponding to each input row associated with the row buffer value may be generated.

As an example, and as shown in FIG. 1E, for the row associated with the end row value (e.g., shown as "end row"), the homography interfacer device may determine a start column value of 20, an end column value of 590, and a gradient value that is greater than the gradient value associated with the start row. For example, based on the area of operation, input rows towards the base of the area of operation may include more pixels that are mapped to output pixels as compared to input rows towards the apex of the area of operation.

In some implementations, the homography interfacer device may determine, based on the row mapping parameter values and/or the column mapping parameter values, input image coordinates that are to be mapped to output image coordinates (e.g., may determine coordinates associated with the area of operation). Additionally, the homography interfacer device may provide, to the projection device, information that identifies the row mapping parameter values and/or the column mapping parameter values, as described below.

As shown in FIG. 1F, and by reference number 115, the homography interfacer device may provide, to a projection device, information that identifies the row mapping parameter values, the row buffer value, and/or the column mapping parameter values. In some implementations, the homography interfacer device may translate the row mapping parameter values, the row buffer value, and/or the column mapping parameter values into executable code that may be used to program the projection device. In this way, the projection device may receive, from an image acquisition device, image data and may generate output images based on the row mapping parameter values, the row buffer value, and/or the column mapping parameter values, as described below. Additionally, or alternatively, the projection device may store information that identifies the row mapping parameter values, the row buffer value, and/or the column mapping parameter values (e.g., using one or more data structures, such as look-up tables, or the like).

In some implementations, the homography interfacer device may provide the information that identifies the row mapping parameter values, the row buffer value, and/or the column mapping parameter values (e.g., projection values) based on determining the projection values. For example, as described above, the homography interfacer device may determine an updated homography matrix (e.g., based on a time frame, based on operation of the vehicle, based on variations in surroundings of the vehicle, etc.). As such, the projection values may vary based on the time frame, based on operation of the vehicle, etc. In some implementations, the homography interfacer device may determine updated projection values, and may provide the updated projection values to the projection device.

In some implementations, the homography matrix may be derived from multiple extrinsic parameters (e.g., a rotation matrix and a translation vector that correspond to a mounting position of the image acquisition device described by a height value, a pitch value, a yaw value, a roll value, etc.). In some implementations, if the homography interfacer device determines (e.g., detects) a variation in an extrinsic parameter, the homography interfacer device may re-derive the homography matrix, and/or may determine updated row mapping parameter values, an updated row buffer value, and/or updated column mapping parameter values. Additionally, the homography interfacer device may provide the updated information to the projection device.

Figure 1G:
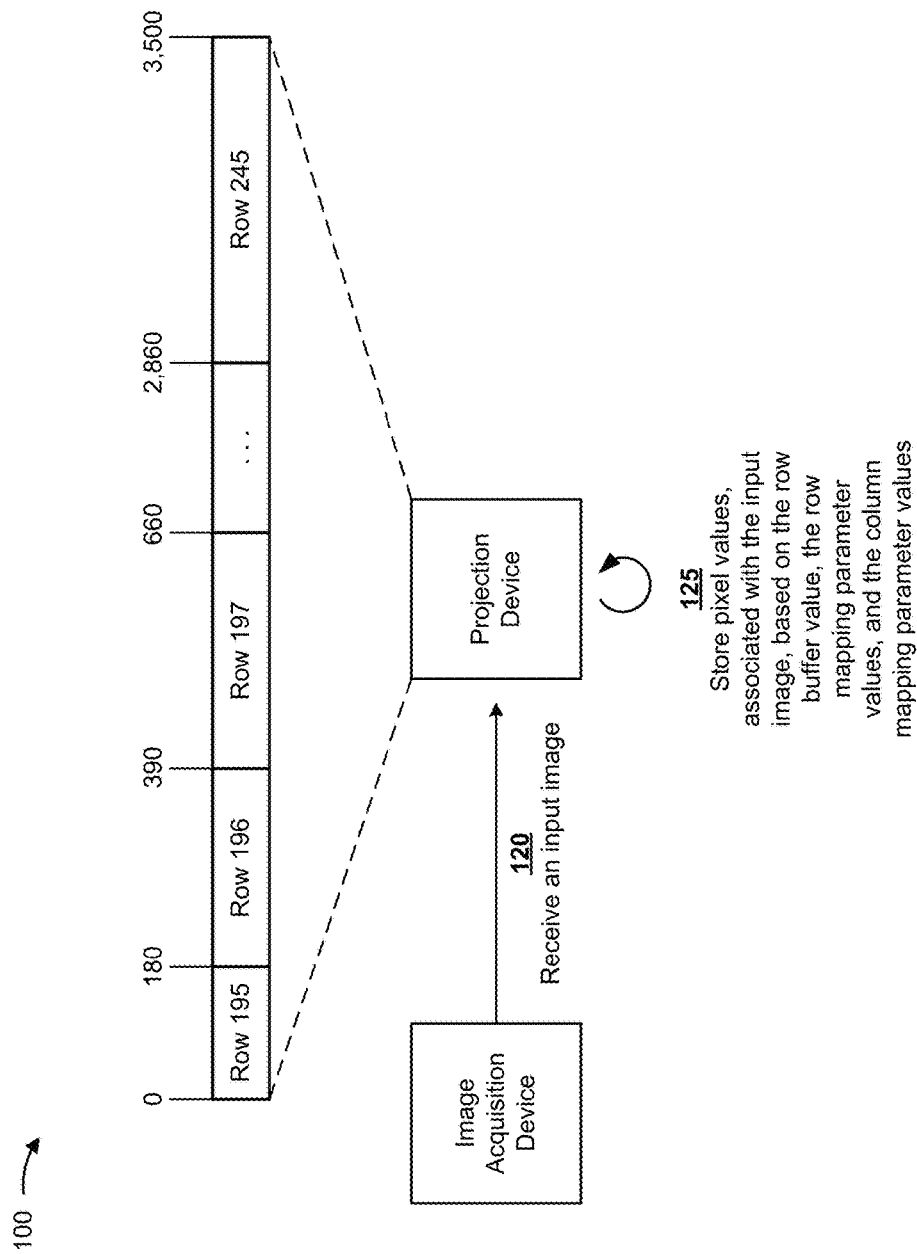

As shown in FIG. 1G, and by reference number 120, the projection device may receive, from an image acquisition device, an input image. As an example, assume that the projection device is associated with a vehicle. In this case, the projection device may receive an input image from an image acquisition device associated with the vehicle. In some implementations, the projection device may receive an input stream of pixel values associated with the input image. For example, the projection device may receive an input stream of pixel values associated with the input image in a particular order and/or sequence. As an example, assume that the input image includes a resolution of 480×640 pixels. In this case, the projection device may receive information that identifies pixel values associated with input image coordinates in the following order and sequence: (1, 1), (1, 2), (1, 3) . . . (480, 639), (480, 640). While implementations are described herein using a particular order and sequence associated with an input pixel stream, other orders and/or sequences may be used. Additionally, while some implementations are described in terms of "first," "last," "starting," "ending," etc., it should be understood that such terms may vary based on an order and/or sequence of an input pixel stream.

As further shown in FIG. 1G, and by reference number 125, the projection device may store pixel values, associated with the input image, based on the row buffer value, the row mapping parameter values, and the column mapping parameter values. In some implementations, the projection device may store pixel values using a buffer (e.g., on-chip RAM). For example, on-chip RAM may include RAM that is embedded directly on a processing component of the projection device (e.g., embedded on an FPGA). Additionally, the projection device may store the pixel values without implementing an external frame buffer. In this way, latency may be reduced, throughput may be increased, and/or processor and/or memory resources may be conserved. For example, the projection device may request pixel values from the buffer, and may receive the requested pixel values at a reduced latency as compared to requesting the pixel values from an external frame buffer.

In some implementations, the projection device may determine an input row associated with the input image (e.g., associated with the input pixel stream). For example, as the projection device receives the input pixel stream, the projection device may determine a particular input row associated with the input pixel stream (e.g., based on input signals, or the like). Additionally, or alternatively, the projection device may determine particular input column coordinates associated with the input pixel stream (e.g., based on input signals, or the like).

In some implementations, the projection device may determine whether an input row satisfies the start row value. As an example, the projection device may receive an input stream of pixel values, may determine a current input row associated with the input stream, may compare the current input row and the start row value, and may determine whether the current input row satisfies the start row value. In some implementations, the projection device may determine that an input row does not satisfy the start row value, and may not store pixel values associated with the input pixel stream based on the input row not satisfying the start row value. As an example, for row 1 through row 189, the projection device may not store pixel values.

In some implementations, the projection device may determine that the input row satisfies the start row value. Additionally, or alternatively, the projection device may determine that the input row satisfies the end row value. In other words, the projection device may determine that the input row is between the start row value and the end row value (inclusive). In some implementations, if a particular input row satisfies the start row value and the end row value, then the projection device may determine whether an input column satisfies the start column value and the end column value of the particular input row. In other words, the projection device may determine whether an input pixel value includes a row coordinate and column coordinate that satisfies the start row value, the end row value, the start column value, and the end column value. In some implementations, if the input pixel value satisfies these values, then the projection device may store the pixel value (e.g., may buffer the pixel value using on-chip RAM).

As an example, assume that the projection device receives input pixel values associated with row 195 of the input image. The projection device may determine that the input row satisfies the start row value, and may determine whether to store particular pixel values associated with the input row based on the start column value (e.g., 210) and the end column value (e.g., 390) associated with row 195. For example, the projection device may store pixel values associated with pixels including column coordinates between 210 and 390 (e.g., (195, 210), (195, 211), . . . (195, 389), (195, 390)).

In some implementations, the projection device may store particular pixel values for each input row that satisfies the start row value and the end row value in a similar manner as described above. In this way, the projection device may store fewer pixel values than as compared to storing pixel values associated with an entire frame, thereby conserving memory resources. As shown in FIG. 1G, the quantity of pixel values, associated with a particular row, may increase with successive rows. For example, assume that row 195 corresponds to the apex of the area of operation. In this case, successive rows (e.g., row 191, row 192, row 250, etc.) may include more pixel values that are stored by the projection device than as compared to row 195 (or a previous row). For example, as shown, the projection device may store 180 pixel values for row 195, may store 210 pixel values for row 191, and may store 640 pixel values for row 245.

In some implementations, the projection device may store information that maps an input row to a stored row. For example, the projection device may store information that maps input row 195 to stored row 1. In this way, the projection device may generate the output image based on stored pixel values associated with particular stored rows, as described below. In some implementations, the buffer may include a one-dimensional buffer that stores pixel values. For example, assume that the stored row 1 (e.g., corresponding to pixels values associated with input row 195) includes 180 pixel values (e.g., based on the start column value and the end column value associated with the input row). In this case, the first 180 pixel values in the buffer may correspond to stored row 1, the next x pixel values may correspond to stored row 2, the next y pixel values may correspond to stored row 3, etc.

As shown in FIG. 1H, the projection device may generate an output image based on the stored pixel values. In some implementations, for a particular output coordinate, the projection device may determine a corresponding pixel value that is stored in the buffer. As shown by reference number 130, the projection device may determine a stored row based on an output row (e.g., based on performing a lookup in a data structure). As an example, for the output coordinate (1, 1) and/or the output row (e.g., 1), the projection device may determine a corresponding stored row (e.g., 1), a row replication value (e.g., 50), an accumulator value (e.g., 0), a start column value (e.g., 210), an end column value (e.g., 390), and/or a gradient value (e.g., 0.3) associated with the stored row (e.g., stored row 1 that is mapped to input row 195).

In some implementations, the accumulator value may represent a quantity of pixel values associated with stored rows that precede a particular stored row. As an example, for stored row 1, the accumulator value is initialized at 0 (e.g., because stored row 1 is the initial stored row in the buffer). Additionally, as an example, for stored row 2, the accumulator value may be incremented by a quantity of pixel values associated with stored row 1 (e.g., 180). As described elsewhere herein, the projection device may implement the accumulator value when generating the output image.

Figure 1I:
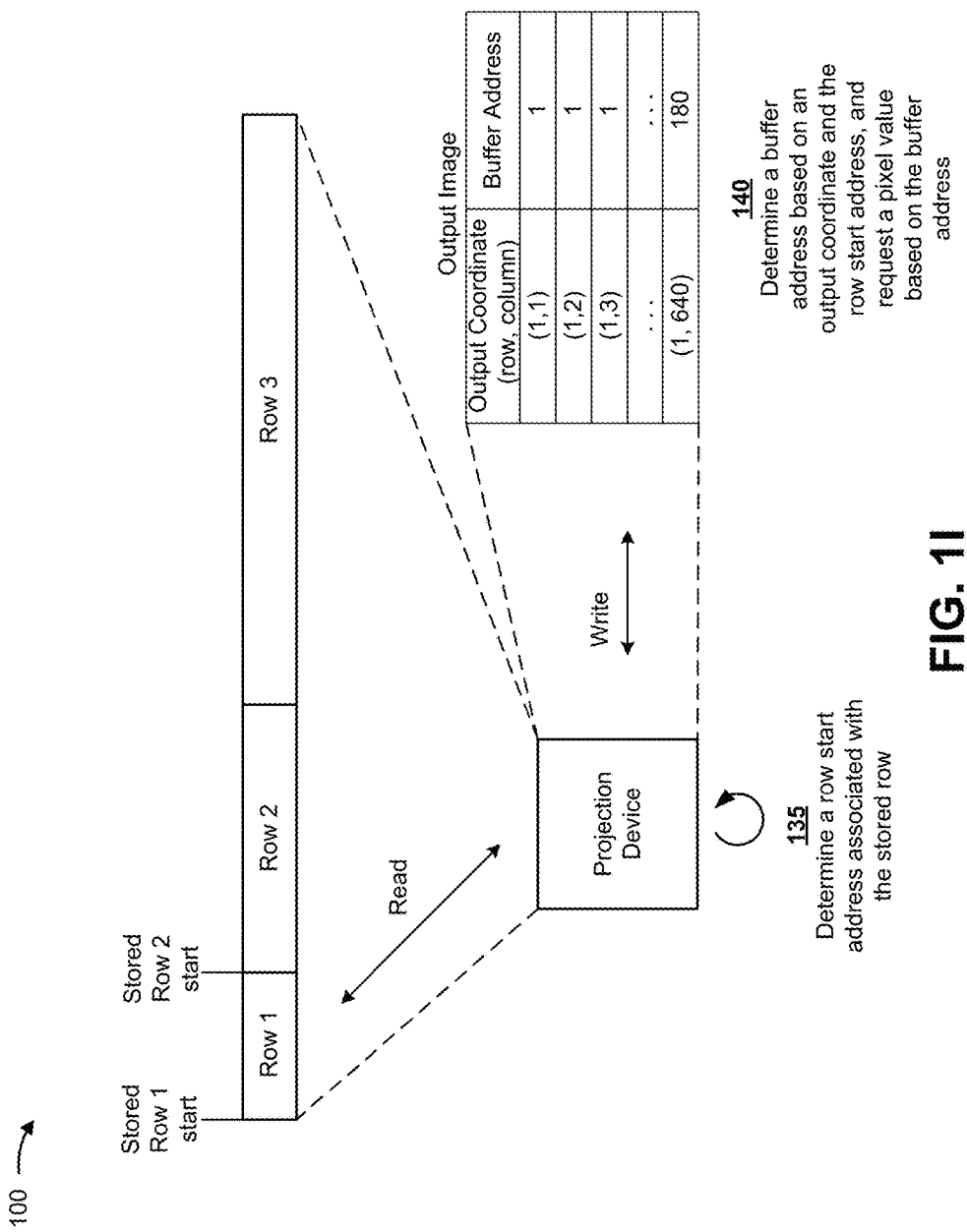

As shown in FIG. 1I, and by reference number 135, the projection device may determine a row start address associated with a particular stored row. For example, the projection device may determine a row start address based on the accumulator value. As an example, the projection device may determine a row start address (e.g., 1) associated with stored row 1 based on the accumulator value (e.g., 0).

In some implementations, the projection device may determine a buffer address, and may request a pixel value from the buffer based on the buffer address and/or generate pixel values based on pixel values associated with particular buffer addresses. Additionally, or alternatively, the projection device may generate a portion of an output image by setting a pixel value of the output image based on a pixel value that was requested from the buffer (e.g., based on a read process and a write process). In some implementations, the projection device may generate a portion of an output image for a particular output row (e.g., may request pixel values for each output coordinate associated with the output row, and may set the output pixel values based on the requested pixel values). In some implementations, the projection device may perform horizontal and vertical interpolation using pixel values associated with stored rows and/or generated output rows, as described below.

As shown by reference number 140, the projection device may determine a buffer address based on an output coordinate and the row start address, and may request a pixel value from the buffer based on the buffer address. In some implementations, the projection device may determine a buffer address based on the following equation:

$$\text{Buffer Address} = (\text{Gradient Value}) \times (\text{Output Column Coordinate}) + (\text{Accumulator Value})$$

As an example, for the output coordinate (1, 1), the projection device may determine a buffer address (e.g., 1) based on a gradient value of the stored row (e.g., 0.3) and an accumulator value (e.g., 0). For example, the projection device may use a mathematical function (e.g., a ceiling function or floor function) to determine a buffer address, from which to request a pixel value, for a particular output coordinate. As shown, based on the gradient value, a pixel value associated with a particular buffer address may map to multiple output coordinates.

While the example shown in FIG. 1I depicts a particular pixel value (e.g., associated with buffer address "1") being replicated multiple times in the output image and/or describes particular mathematical functions for determining buffer addresses for which to request pixel values, other implementations include other techniques for generating the output image (e.g., interpolation, or the like). For example, the projection device may implement one or more interpolation techniques when generating the output image (e.g., nearest-neighbor interpolation, bilinear interpolation, bicubic interpolation, or the like).

In some implementations, the projection device may horizontally interpolate pixel values. As a particular example, assume that the projection device determines a buffer address of "50.3." In this case, the projection device may, using a ceiling or floor function, determine a pixel value associated with a particular buffer address (e.g., "50" or "51"). Alternatively, the projection device may interpolate and generate a pixel value using pixel values associated with multiple buffer addresses (e.g., "50" and "51"). As a particular example, the projection device may generate a pixel value using pixel values associated with buffer addresses "50" and "51." Additionally, as an example, the projection device may apply a weight value (e.g., "0.7") to the pixel value associated with buffer address "50," and apply another weight value (e.g., "0.3") to the pixel value associated with buffer address "51," and generate a pixel value based on applying the weight values (e.g., may combine the weighted pixel values).

In some implementations, the projection device may horizontally and vertically interpolate pixel values. For example, as described elsewhere herein, assume that row 195 of the input image includes a row replication value of 50. That is, row 195 of the input image is replicated (or interpolated) 50 times in the output image. In this case, the projection device may perform vertical interpolation using pixel values associated with row 195 of the input image and row 196 of the input image (e.g., stored rows 1 and 2). Row 195 of the input image and stored row 1 may be used interchangeably, as described below.

For example, assume that stored row 1 maps to rows 1 through 50 of the output image, and includes a row replication value of 50. In this case, the projection device may use pixel values, associated with stored row 1, when generating output row 1. Additionally, the projection device may perform horizontal interpolation, using pixel values of stored row 1, as described above. For row 2 of the output image, the projection device may perform vertical interpolation using pixel values associated with stored row 1 and stored row 2 (e.g., horizontally interpolated pixel values associated with stored row 2 and/or output row 51), and/or may apply a first vertical weight value. Further, for row 3 of the output image, the projection device may perform vertical interpolation using pixel values associated with stored row 1 and stored row 2, and/or may apply a second vertical weight value (e.g., that applies more weight towards stored row 2 than as compared to the first vertical weight value). That is, as the output rows move towards output row 50, the projection device may apply a vertical weight value that applies more weight towards stored row 2 and applies less weight towards stored row 1. Additionally, or alternatively, the projection device may perform vertical interpolation using a generated output row. As a particular example, for row 4 of the output image, the projection device may perform vertical interpolation using pixel values associated with row 3 of the output image, and/or another row of the output image.

In this way, the projection device may perform both horizontal and vertical interpolation. That is, the projection device may generate a pixel value, for an output row, based on pixel values associated with a stored row, based on pixel values associated with another stored row, based on pixel values associated with another output row, and/or the like. Additionally, the projection device may interpolate a pixel value based on one or more interpolated pixel values (e.g., horizontally and/or vertically interpolated pixel values).

Figure 1J:
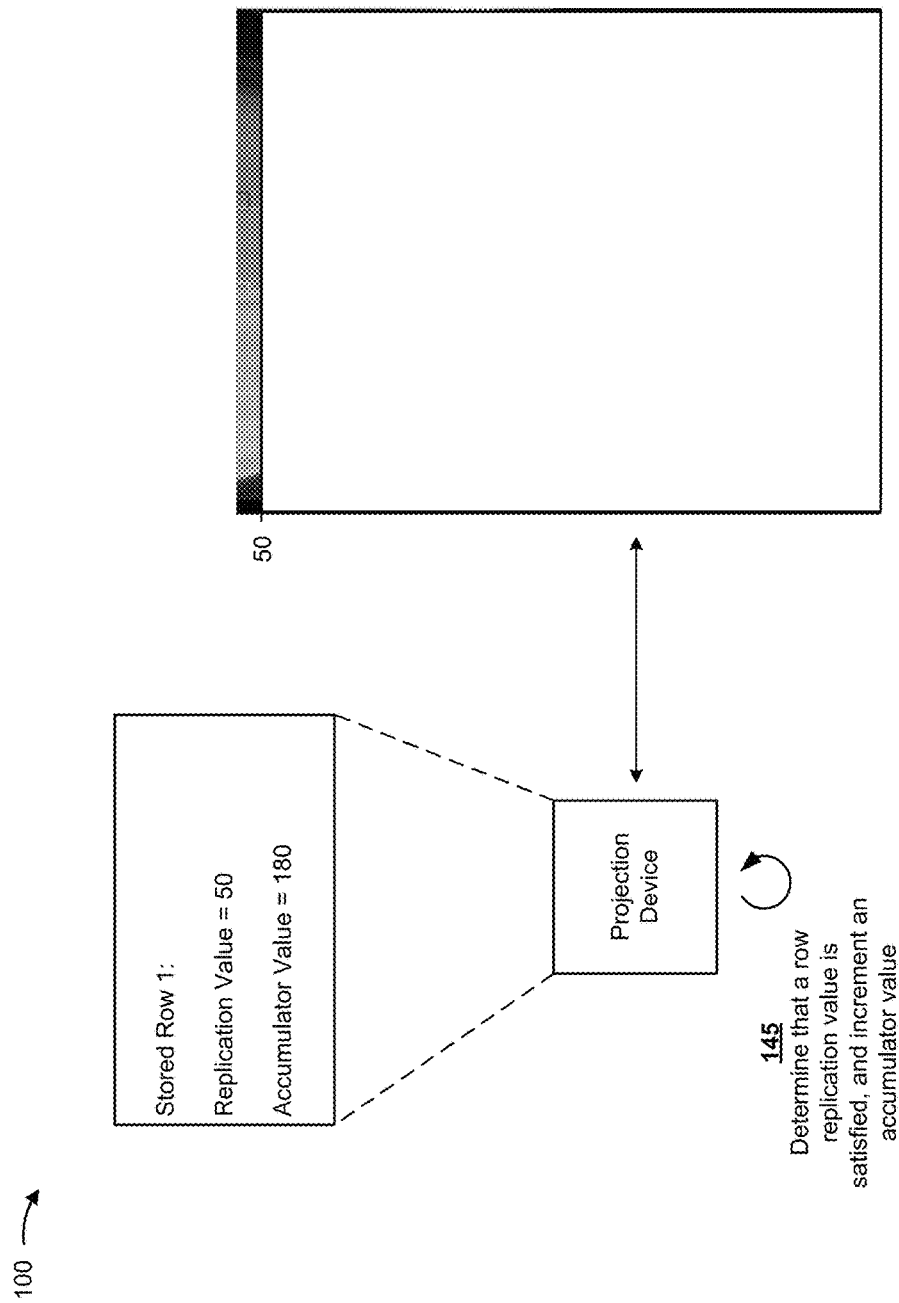

As shown in FIG. 1J, and by reference number 145, the projection device may determine that a row replication value is satisfied, and may increment an accumulator value. For example, the projection device may determine whether a row replication value, associated with a stored row, is satisfied. For example, a particular stored row may be replicated multiple times in the output image based on a particular row replication value. In some implementations, the projection device may replicate a particular output row based on a row replication value (e.g., may set pixel values for other output rows based on pixel values associated with a particular output row). As an example, assume that stored row 1 includes a row replication value of 50 (e.g., indicating that pixel values associated with stored row 1 may be replicated 50 times in the output image). In this case, the projection device may use pixel values associated with stored row 1 (and/or output row 1) to generate the first 50 output rows.

In some implementations, the projection device may determine that the row replication value associated with a particular row is satisfied, and may adjust an accumulator value (e.g., increment an accumulator value by a quantity of pixels associated with the particular stored row associated with the row replication value). As an example, assume that the projection device determines that the row replication value associated with stored row 1 is satisfied. In this case, the projection device may increment an accumulator value by 180. For example, the projection device may determine a quantity of pixel values associated with stored row 1, and may increment the accumulator value by the quantity of pixel values. As an example, the projection device may determine the quantity of pixel values based on a start column value and an end column value associated with the particular row. In the case of stored row 1, the projection device may determine a quantity of 180 pixel values based on the end column value (e.g., 390) and the start column value (e.g., 210). In this way, the projection device may determine a start row address associated with stored row 2 (e.g., 181).

As shown in FIG. 1K, the projection device may generate portions of the output image based on pixel values associated with stored row 2. As shown by reference number 150, the projection device may generate portions of the output image based on the accumulator value (e.g., 180). For example, the projection device may determine buffer addresses, that correspond to particular output coordinates, and may request pixel values based on the buffer addresses, in a similar manner as described above. The projection device may proceed to perform processes shown in FIGS. 1H-1K for each output row of the output image.

Figure 1L:
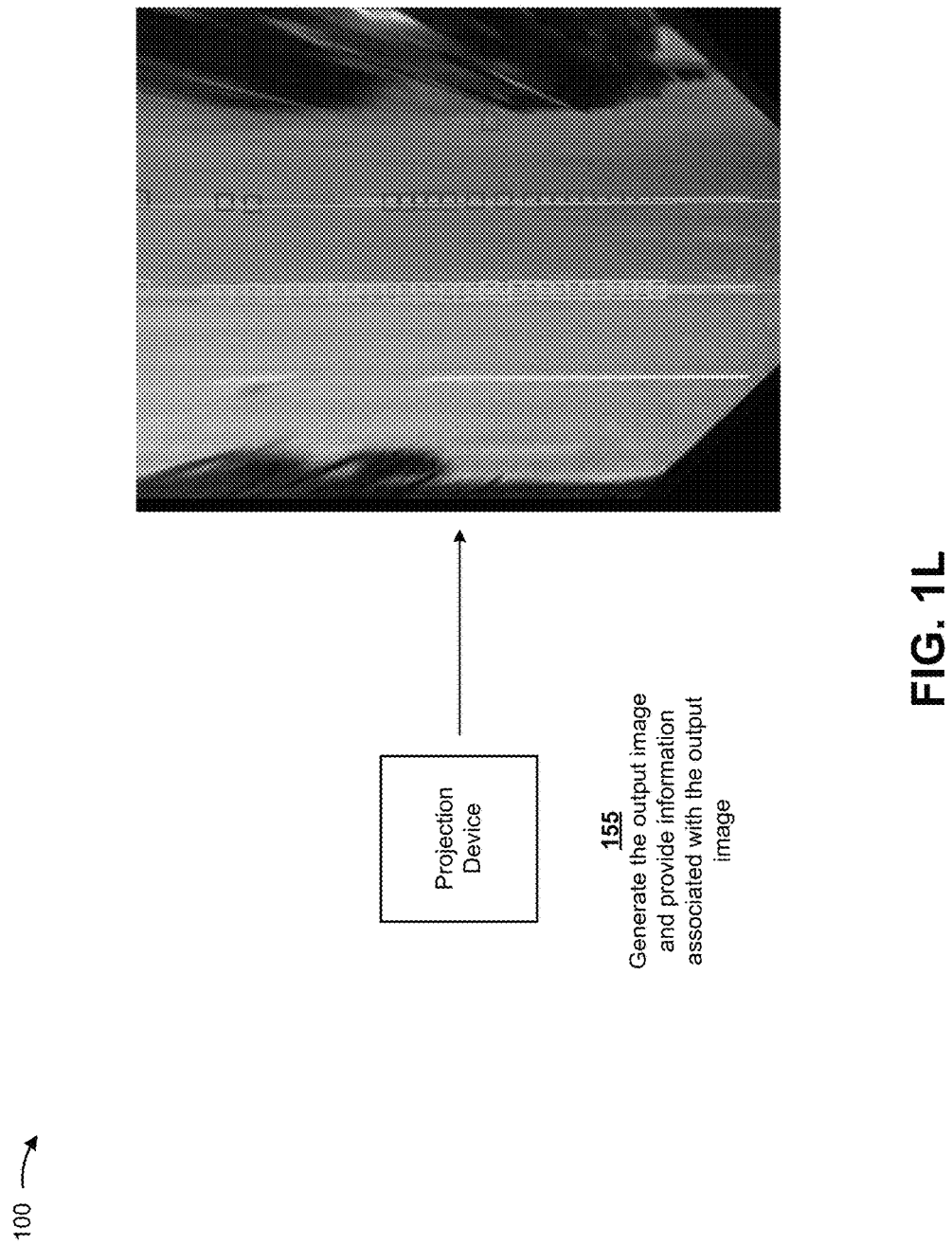

As shown in FIG. 1L, and by reference number 155, the projection device may generate the output image (e.g., may determine pixel values for each output coordinate), and may provide information associated with the output image. As an example, the projection device may provide information associated with the generated output image to another device (e.g., an ADAS device) and/or for display. In some implementations, the generated output image may include a frame from a video. In this instance, the projection device may proceed to perform processes detailed in FIGS. 1G-1K for a next frame in the video.

Implementations described herein enable a projection device to receive an input frame, store a subset of pixel values associated with the input frame, and generate an output image based on the stored pixel values. In this way, implementations described herein may conserve memory resources associated with the projection device. Additionally, implementations described herein enable the projection device to store pixel values in on-chip RAM instead of requiring that the projection device store pixel values in an external frame buffer. In this way, the projection device may request and receive pixel values at a reduced latency.

As indicated above, FIGS. 1A-1L are provided as an example. Other examples are possible and may differ from what was described in connection with FIGS. 1A-1L.

Figure 2:
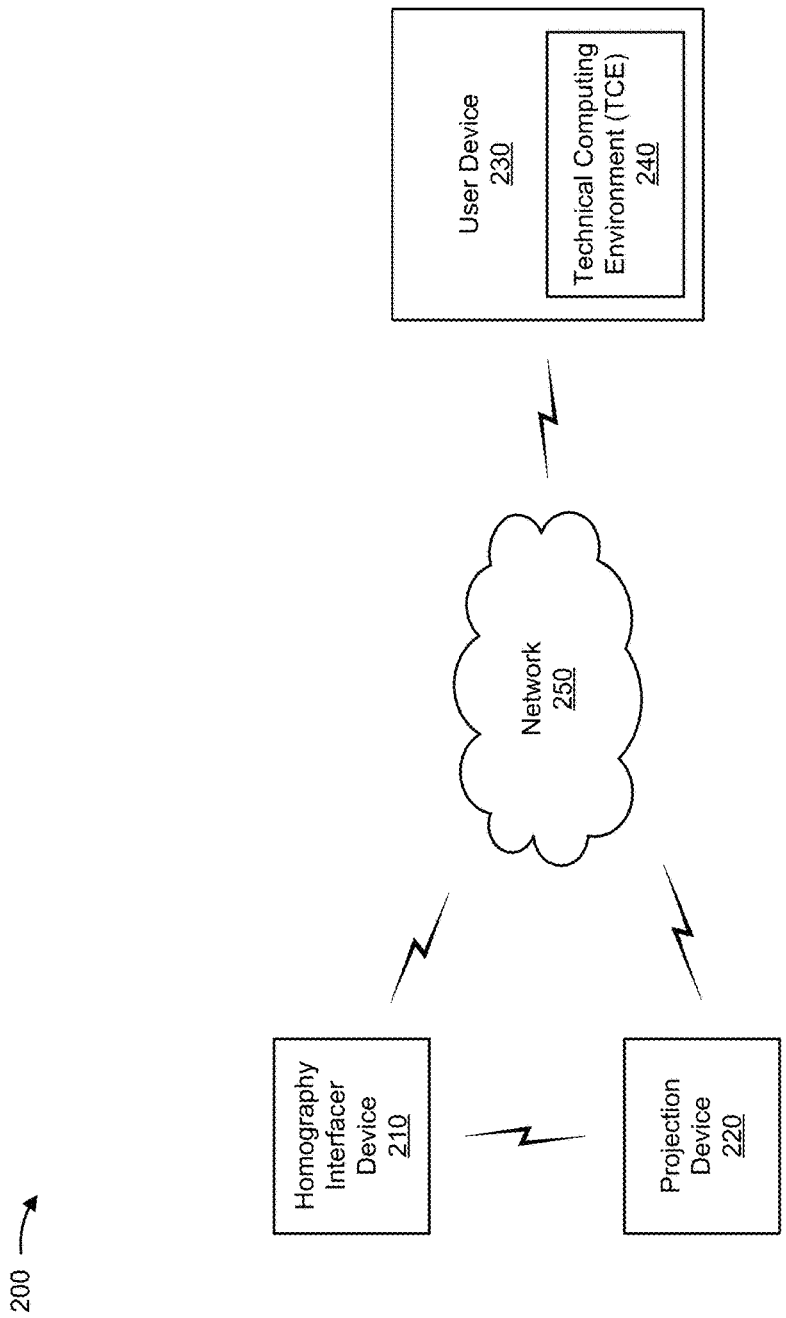
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a homography interfacer device 210, a projection device 220, a user device 230, which may include a technical computing environment (TCE) 240, and a network 250. Devices of environment 200 may interconnect via wired connections, wireless connections, or a combination of wired and wireless connections.

Homography interfacer device 210 includes one or more devices capable of processing an image. For example, homography interfacer device 210 may include a computing device, an image processing device, a desktop computer, a laptop computer, a tablet computer, a handheld computer, a server, a mobile phone, a camera, a set-top box, a monitor, a gaming device, or a similar device. In some implementations, homography interfacer device 210 may receive, generate, store, process, and/or provide information associated with an image processing technique (e.g., a homography matrix, a row mapping parameter value, a column mapping parameter value, etc.). Additionally, or alternatively, homography interfacer device 210 may receive information from and/or transmit information to projection device 220 and/or user device 230. In some implementations, homography interfacer device 210 may include a device capable of compiling and/or executing HDL code (and/or other program code), which may be received from user device 230. In some implementations, homography interfacer device 210 may include an embedded hardware device associated with a vehicle.

Projection device 220 includes one or more devices capable of processing an image. For example, projection device 220 may include a computing device, an image processing device, or the like. In some implementations, projection device 220 may receive information from and/or transmit information to homography interfacer device 210. In some implementations, projection device 220 may include a device capable of compiling and/or executing HDL code (and/or other program code), which may be received from homography interfacer device 210 and/or user device 230. In some implementations, projection device 220 may include an embedded hardware device (e.g., a device including an FPGA) associated with a vehicle. Additionally, or alternatively, projection device 220 may receive information associated with an image (e.g., from an image acquisition device, a sensor device, etc.), may generate an output image, and may provide information associated with the output image to another device (e.g., an ADAS device).

User device 230 includes one or more devices capable of receiving, generating, storing, processing, and/or providing information associated with an image. For example, user device 230 may include a computing device, such as a desktop computer, a laptop computer, a tablet computer, a mobile phone (e.g., a smart phone, a radiotelephone, etc.), or a similar device. User device 230 may provide information associated with an image processing technique (e.g., a quantity of rows to buffer, a resolution of an output image, etc.) to homography interfacer device 210. In some implementations, user device 230 may generate HDL code for processing an image, and may provide the HDL code to homography interfacer device 210 and/or projection device 220. In some implementations, user device 230 may generate a block diagram, compile the block diagram, generate executable code based on the block diagram, and provide the executable code to another device (e.g., homography interfacer device 210 and/or projection device 220). In some implementations, the block diagram may be translated to code specific for an embedded hardware target, and the embedded hardware target may execute the functionality of the block diagram.

User device 230 may host TCE 240. TCE 240 may include any hardware-based component or a combination of hardware and software-based components that provides a computing environment that allows tasks to be performed (e.g., by users) related to disciplines, such as, but not limited to, mathematics, science, engineering, medicine, and business. TCE 240 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

Network 250 includes one or more wired and/or wireless networks. For example, network 250 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
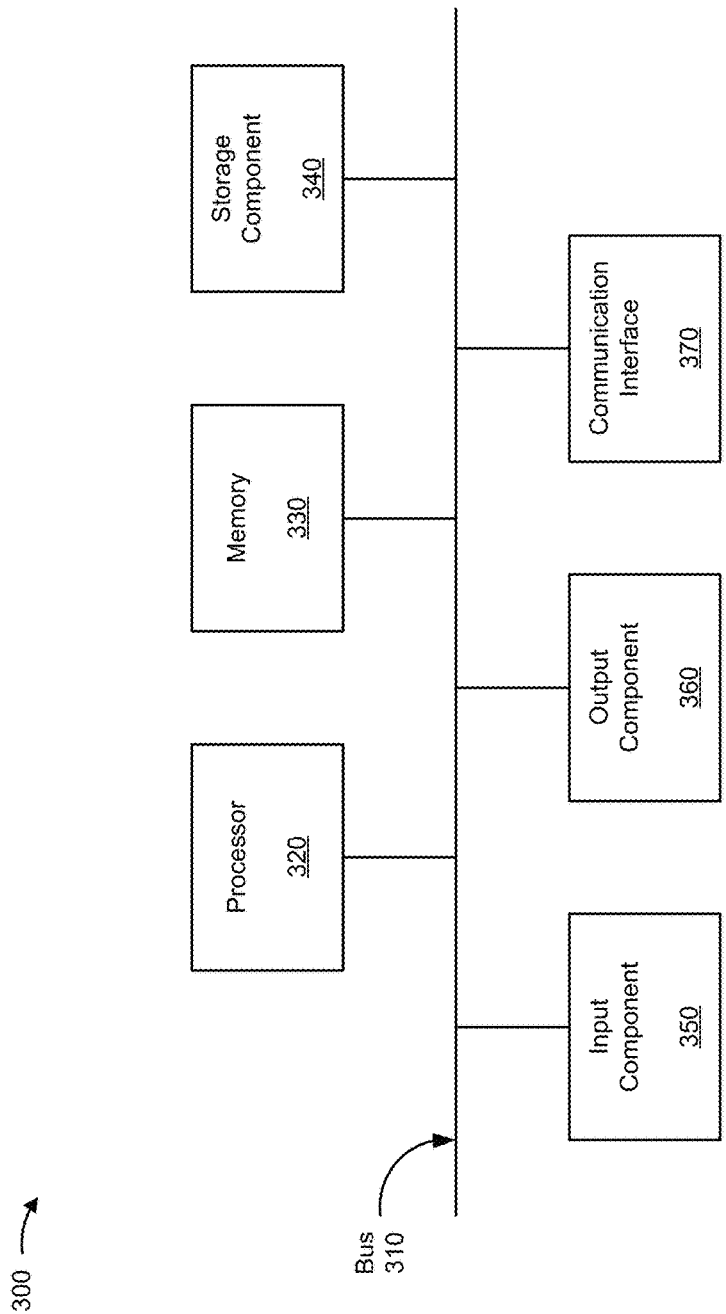
FIG. 3 is a diagram of example components of one or more devices of FIG. 2.

FIG. 3 is a diagram of example components of a device 300. Device 300 may correspond to homography interfacer device 210, projection device 220, and/or user device 230. In some implementations, homography interfacer device 210, projection device 220, and/or user device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., an FPGA and/or an application-specific integrated circuit (ASIC)) that interprets and/or executes instructions. In some implementations, processor 320 includes one or more processors capable of being programmed to perform a function. Memory 330 includes a RAM, a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
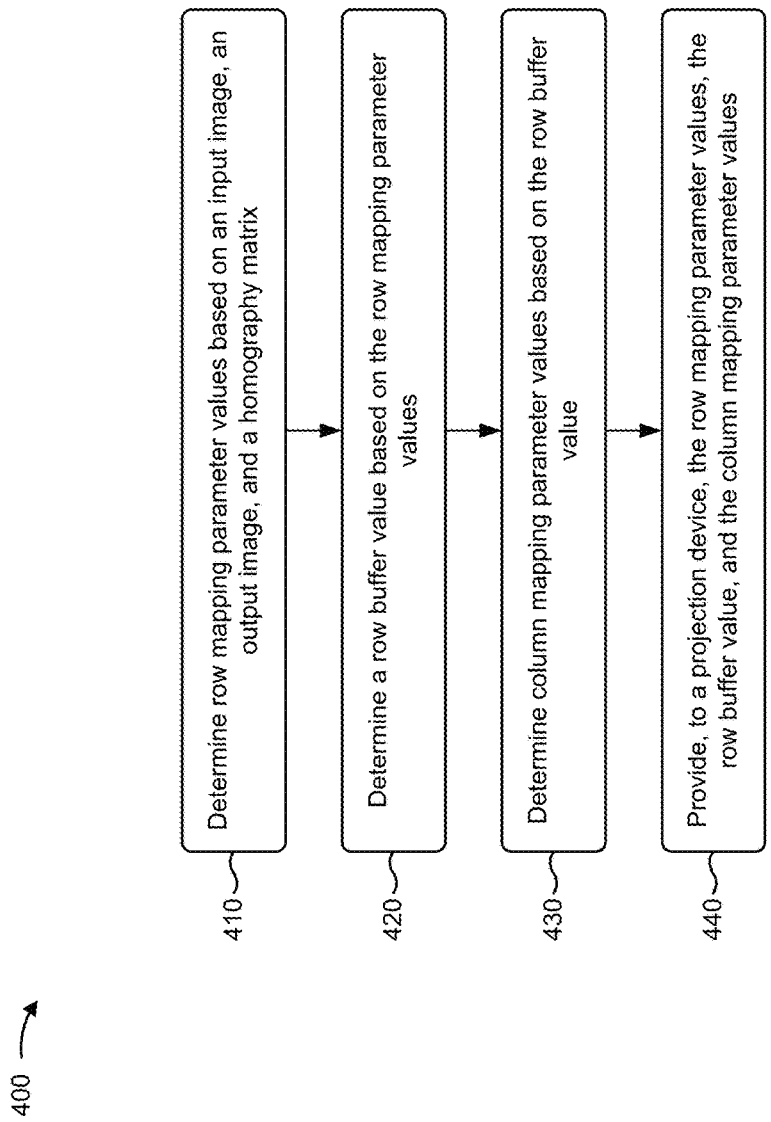
FIG. 4 is a flow chart of an example process for determining row mapping parameter values and column mapping parameter values.

FIG. 4 is a flow chart of an example process 400 for determining row mapping parameter values and column mapping parameter values. In some implementations, one or more process blocks of FIG. 4 may be performed by homography interfacer device 210. In some implementations, one or more process blocks of FIG. 4 may be performed by another device or a group of devices separate from or including homography interfacer device 210, such as projection device 220 and/or user device 230.

As shown in FIG. 4, process 400 may include determining row mapping parameter values based on an input image, an output image, and a homography matrix (block 410). For example, homography interfacer device 210 may determine input coordinates, associated with an input image, that map to output coordinates associated with an output image based on a homography matrix. As used herein, a coordinate (e.g., an input coordinate and/or an output coordinate) may refer to an image coordinate (e.g., an input image coordinate and/or an output image coordinate). Additionally, homography interfacer device 210 may determine row mapping parameter values based on the input coordinates that map to the output coordinates.

In some implementations, homography interfacer device 210 may determine an input coordinate that maps to an output coordinate based on the homography matrix. Additionally, or alternatively, homography interfacer device 210 may determine a start row value based on the input coordinate. In some implementations, homography interfacer device 210 may receive information associated with an image acquisition device that is associated with the input image, and may determine the homography matrix based on the information.

In some implementations, homography interfacer device 210 may determine a mapping between first input coordinates and first output coordinates, and may determine a row replication value based on the mapping between the first input coordinates and the first output coordinates. Additional details regarding determining row mapping parameter values are described above in connection with FIGS. 1A-1L.

As further shown in FIG. 4, process 400 may include determining a row buffer value based on the row mapping parameter values (block 420). For example, homography interfacer device 210 may determine a quantity of rows, of the input image, that may be buffered to generate an output image. In some implementations, homography interfacer device 210 may receive, from user device 230, information that identifies the row buffer value. Additionally, or alternatively, homography interfacer device 210 may determine an input coordinate that maps to an output coordinate, and may determine a start row value based on the input coordinate. Additionally, or alternatively, homography interfacer device 210 may determine an end row value based on the start row value and the row buffer value.

In some implementations, homography interfacer device 210 may determine a first quantity of rows, associated with the input image, that map to rows associated with the output image. The input image may include a second quantity of rows. The second quantity may be different than the first quantity. In some implementations, homography interfacer device 210 may determine the row buffer value based on the first quantity of rows. Additional details regarding determining a row buffer value are described above in connection with FIGS. 1A-1L.

As further shown in FIG. 4, process 400 may include determining column mapping parameter values based on the row buffer value (block 430). For example, homography interfacer device 210 may determine column mapping parameter values for each row of the quantity of rows associated with the row buffer value.

In some implementations, homography interfacer device 210 may determine a mapping between input coordinates and output coordinates. Additionally, or alternatively, homography interfacer device 210 may determine a first start column value for a first input row of the input image based on the mapping, and may determine a second start column value for a second input row of the input image based on the mapping. In some implementations, the second start column value and the first start column value may be different. Additional details regarding determining column mapping parameter values are described above in connection with FIGS. 1A-1L.

As further shown in FIG. 4, process 400 may include providing, to a projection device, the row mapping parameter values, the row buffer value, and the column mapping parameter values (block 440). For example, homography interfacer device 210 may provide, to projection device 220, information that may cause projection device 220 to generate output images based on the row mapping parameter values, the row buffer value, and the column mapping parameter values. For example, projection device 220 may receive other input images and may store pixel values, associated with input coordinates, based on the row mapping parameter values, the row buffer value, and the column mapping parameter values. Additional details regarding providing the row mapping parameter values, the row buffer value, and the column mapping parameter values are described above in connection with FIGS. 1A-1L.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
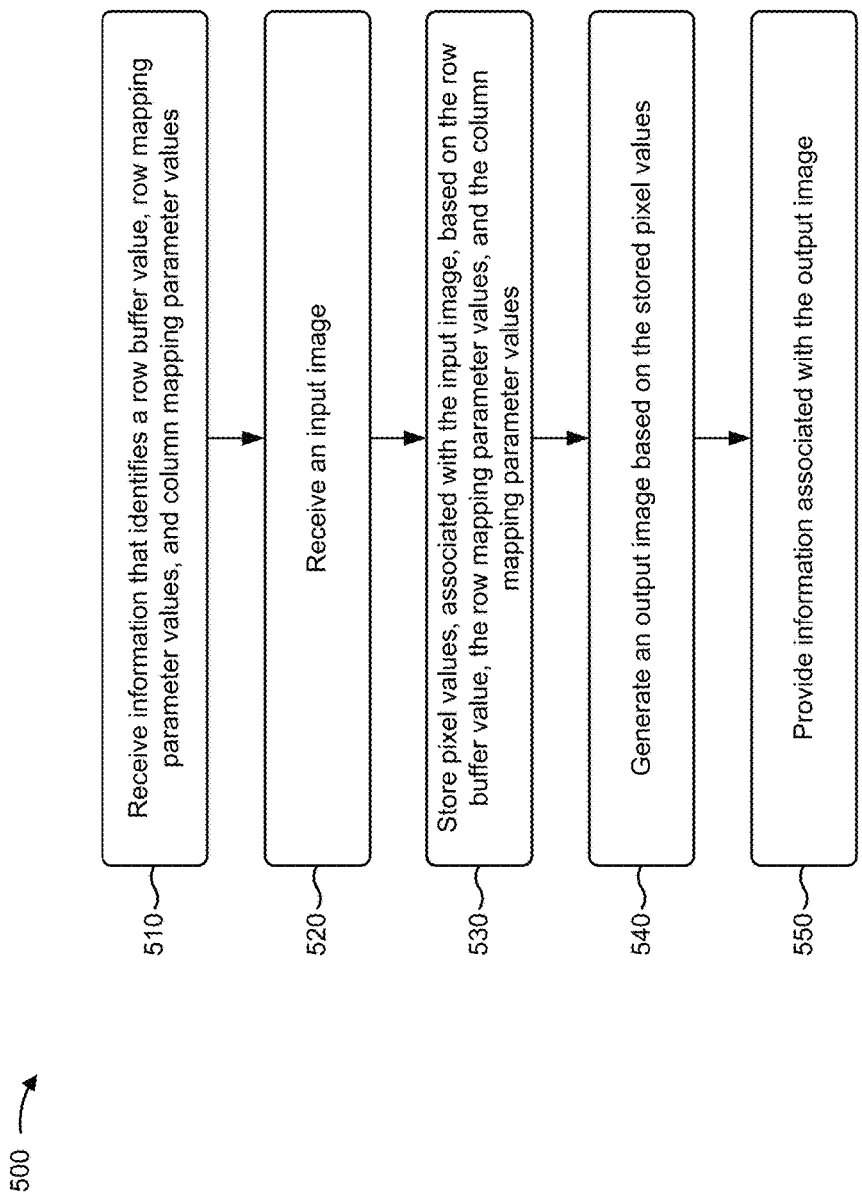
FIG. 5 is a flow chart of an example process for generating an output image based on the row mapping parameter values and the column mapping parameter values.

FIG. 5 is a flow chart of an example process 500 for generating an output image based on the row mapping parameter values and the column mapping parameter values. In some implementations, one or more process blocks of FIG. 5 may be performed by projection device 220. In some implementations, one or more process blocks of FIG. 5 may be performed by another device or a group of devices separate from or including projection device 220, such as homography interfacer device 210 and/or user device 230.

As shown in FIG. 5, process 500 may include receiving information that identifies a row buffer value, row mapping parameter values, and column mapping parameter values (block 510). For example, projection device 220 may receive, from homography interfacer device 210, information that may cause projection device 220 to generate output images based on a row buffer value, the row mapping parameter values, and the column mapping parameter values (e.g., determined by homography interfacer device 210 as described in connection with FIG. 4). Additional details regarding receiving information that identifies a row buffer value, row mapping parameter values, and column mapping parameter values are described above in connection with FIGS. 1A-1L.

As further shown in FIG. 5, process 500 may include receiving an input image (block 520), and storing pixel values, associated with the input image, based on the row buffer value, the row mapping parameter values, and the column mapping parameter values (block 530). For example, projection device 220 may receive, from an image acquisition device, pixel values associated with an input image. In some implementations, the input image may include a first quantity of rows.

For example, projection device 220 may store a subset of pixel values associated with the input image. In some implementations, the stored pixel values may correspond to a second quantity of rows that is different than a first quantity of rows associated with the input image. In some implementations, the input image may be associated with a first quantity of pixel values. Additionally, or alternatively, projection device 220 may store a second quantity of pixel values that is different than the first quantity of pixel vales. In some implementations, projection device 220 may store the pixel values using on-chip RAM.

In some implementations, projection device 220 may identify an input row associated with the input image. Additionally, projection device 220 may determine that the input row satisfies a start row value and an end row value. Additionally, projection device 220 may identify pixel values, of the input row, that are associated with a plurality of column coordinates. Each column coordinate may satisfy a start column value and an end column value. Projection device 220 may store the pixel values based on each column coordinate satisfying the start column value and the end column value.

In some implementations, projection device 220 may store a first quantity of pixel values associated with a first row of the input image, and may store a second quantity of pixel values associated with a second row of the input image. In some implementations, the first quantity of pixel values may be different than the second quantity of pixel values. Additional details regarding storing pixel values are described above in connection with FIGS. 1A-1L.

As further shown in FIG. 5, process 500 may include generating an output image based on the stored pixel values (block 540). For example, projection device 220 may set pixel values, of an output image, based on the stored pixel values. In some implementations, the output image may include a projective transformation of the input image. For example, the output image may include a bird's eye view image (e.g., an aerial view image, an overhead view image, or the like). In some implementations, the output image may include a bird's eye view image whereas the input image may not include a bird's eye view image. For example, the input image may be a front-facing view image, a panoramic view, a wide-angle view, a fisheye view, or the like.

In some implementations, projection device 220 may determine a set of pixel values, associated with a buffer, based on a row start address and a gradient value. Additionally, projection device 220 may perform an interpolation technique in association with the set of pixel values, and generate the output image based on performing the interpolation technique.

In some implementations, projection device 220 may receive information that identifies a row replication value, and may generate the output image based on the row replication value. For example, projection device 220 may determine that a row replication value, associated with a first row, is satisfied, and may increment an accumulator value based on the row replication value being satisfied. The accumulator value may be incremented by a first quantity of pixel values. The first quantity of pixel values may be associated with the first row. In some implementations, projection device 220 may determine a row start address of a second row based on the accumulator value. In some implementations, projection device 220 may determine a quantity of pixel values associated with a first stored row. Additionally, projection device 220 may determine a start row address, associated with a second stored row, based on the quantity of first pixel values.

In some implementations, projection device 220 may receive information that identifies a first gradient value associated with a first stored row, and may receive information that identifies a second gradient value associated with a second stored row. In some implementations, the first gradient value and the second gradient value may be different. In some implementations, projection device 220 may generate the output image based on the first gradient value and the second gradient value. Additional details regarding generating the output image are described above in connection with FIGS. 1A-1L.

As further shown in FIG. 5, process 500 may include providing information associated with the output image (block 550). For example, projection device 220 may provide information that identifies the output image to another device (e.g., an ADAS device) and/or for display. Additional details regarding providing information associated with the output image are described above in connection with FIGS. 1A-1L.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein enable a projection device to receive pixel values associated with an input image, store a subset of the pixel values, and generate an output image based on the stored subset of pixel values. Implementations described herein enable the projection device to generate output images without requiring that the projection device store an entire input frame. Additionally, implementations described herein enable the projection device to store pixel values using on-chip RAM, thereby reducing a latency involved with output image generation. Additionally, implementations described herein enable the projection device to generate an output image that is a projective transformation of an input image, without requiring that the projection device perform particular mathematical operations. As an example, implementations described herein enable the projection device to generate an output image that is a projective transformation without requiring that the projection device implement the projective transformation equation shown in FIGS. 1A, 1B, and 1D (e.g., which requires division). In this way, implementations described herein may conserve processor and/or memory resources of the projection device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) is to be broadly interpreted to include text-based code that may not require further processing to execute (e.g., C++ code, HDL code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
 receiving, by one or more devices, information associated with an input image that includes input pixels arranged in input rows and input columns within a set of input coordinates,
  the input image to be transformed into an output image that includes output pixels arranged in output rows and output columns within a set of output coordinates;
 determining, by the one or more devices or one or more different devices, a mapping between a first input pixel in a first input row, of the input rows, and a corresponding output pixel in a first output row of the output rows;
 determining, by the one or more devices or the one or more different devices, a quantity of rows based on the mapping,
  the quantity of rows being smaller than a total number of the input rows;
 selectively storing pixel values that are in or between a starting input row and an end input row,
  a total number of rows from the starting input row to the end input row being the quantity of rows;
 determining a row replication value that indicates a quantity of times that the first output row or the first input row is to be replicated in the output image; and
 generating the output image using at least some of the stored pixel values,
  the generating the output image comprising determining that the row replication value is satisfied, and
  the output image being a transformed image of the input image.

2. The method of claim 1, where selectively storing the pixel values comprises:
 storing the pixel values using on-chip random access memory.

3. The method of claim 1, where selectively storing the pixel values comprises:
 storing a first quantity of pixel values associated with the first input row; and
 storing a second quantity of pixel values associated with a second row of the input rows, the first quantity being different than the second quantity.

4. The method of claim 1, further comprising:
 determining a stored row based on an output row;
 determining a row start address associated with the stored row;
 determining a set of pixel values, associated with a buffer, based on the row start address and a gradient value; and
 performing an interpolation technique in association with the set of pixel values,
  where generating the output image comprises:
   generating the output image based on performing the interpolation technique in association with the set of pixel values.

5. The method of claim 1,
 where the row replication value is associated with the starting input row; and
 where the method further comprises:
  incrementing an accumulator value based on the row replication value being satisfied,
   the accumulator value being incremented by a first quantity of pixel values,
   the first quantity of pixel values being associated with the starting input row, and
  where generating the output image comprises:
   generating the output image based on the accumulator value.

6. The method of claim 1, where the mapping is determined based on information associated with an image acquisition device used to generate the input image.

7. The method of claim 1,
 where the output image is a bird's eye view image, and
 where the input image is not a bird's eye view image.

8. A non-transitory computer-readable medium storing instructions, the instructions comprising:
 one or more instructions that, when executed by one or more processors, cause the one or more processors to:
  identify information associated with an input image that includes input pixels arranged in input rows and input columns within a set of input coordinates,
   the input image to be transformed into an output image that includes output pixels arranged in output rows and output columns within a set of output coordinates;
  determine a mapping between a first input pixel in a first input row, of the input rows, and a corresponding output pixel in a first output row of the output rows;
  determine a quantity of rows based on the mapping;
  selectively store pixel values that are in or between a starting input row and an end input row,
   a total number of rows from the starting input row to the end input row being the quantity of rows;
  determine a row replication value that indicates a quantity of times that the first output row or the first input row is to be replicated in the output image; and
  generate the output image based on the stored pixel values,
   where the one or more instructions that cause the one or more processors to generate the output image comprise one or more instructions that cause the one or more processors to determine that the row replication value is satisfied, and
   the output image being a transformed image of the input image.

9. The non-transitory computer-readable medium of claim 8, where the one or more instructions, when executed by the one or more processors, cause the one or more processors to:
 determine the first input pixel that maps to the corresponding output pixel; and
 determine a starting input row value based on the first input pixel.

10. The non-transitory computer-readable medium of claim 8, where the row replication value is determined based on the mapping.

11. The non-transitory computer-readable medium of claim 8, where the one or more instructions, when executed by the one or more processors, cause the one or more processors to:
 determine a first start column value for the first input row; and determine a second start column value for a second input row of the input rows,
the second start column value being different than the first start column value.

12. The non-transitory computer-readable medium of claim 8,
where the one or more instructions, when executed by the one or more processors, cause the one or more processors to:
receive information associated with an image acquisition device,
the image acquisition device to generate the input image, and
where the mapping is determined based on the information associated with the image acquisition device.

13. The non-transitory computer-readable medium of claim 8,
where the output image is a bird's eye view image, and
where the input image is not a bird's eye view image.

14. A device, comprising:
a memory; and
one or more processors to:
receive first information associated with an input image that includes input pixels arranged in input rows and input columns within a set of input coordinates,
the input image to be transformed into an output image that includes output pixels arranged in output rows and output columns within a set of output coordinates;
determine a mapping between a first input pixel in a first input row, of the input rows, and a corresponding output pixel in a first output row of the output rows;
determine a quantity of rows based on the mapping, the quantity of rows being smaller than a total number of the input rows;
selectively store pixel values that are in or between a starting input row and an end input row,
a total number of rows from the starting input row to the end input row being the quantity of rows;
determine a row replication value that indicates a quantity of times that the first output row or the first input row is to be replicated in the output image; and
generate the output image using at least some of the stored pixel values,
when generating the output image, the one or more processors are to
determine that the row replication value is satisfied, and
the output image being a transformed image of the input image.

15. The device of claim 14, where the one or more processors are further to:
store a different number of pixel values for each row of the input image.

16. The device of claim 14,
where the output image is a bird's eye view image, and
where the input image is not a bird's eye view image.

17. The device of claim 14,
where the one or more processors are further to:
determine a start row address, associated with a second stored row, based on a quantity of pixel values in the set of input coordinates; and
where the output image is generated based on the start row address.

18. The device of claim 14,
where the one or more processors are further to:
increment an accumulator value based on a third quantity of pixel values associated with the first output row; and
where the output image is generated based on the accumulator value.

19. The device of claim 14, where the one or more processors are further to:
receive second information that identifies a first gradient value associated with a first stored row; and
receive third information that identifies a second gradient value associated with a second stored row,
the first gradient value and the second gradient value being different; and
where the one or more processors, when generating the output image, are to:
generate the output image based on the first gradient value and the second gradient value.

20. The device of claim 14, where the mapping is determined based on information associated with an image acquisition device used to generate the input image.

* * * * *